(12) United States Patent
Leighton

(10) Patent No.: US 11,863,730 B2
(45) Date of Patent: Jan. 2, 2024

(54) OPTICAL WAVEGUIDE COMBINER SYSTEMS AND METHODS

(71) Applicant: Snap Inc., Santa Monica, CA (US)

(72) Inventor: James Raymond Leighton, Burghfield Common (GB)

(73) Assignee: Snap Inc., Santa Monica, CA (US)

( * ) Notice: Subject to any disclaimer, the term of this patent is extended or adjusted under 35 U.S.C. 154(b) by 192 days.

(21) Appl. No.: 17/544,870

(22) Filed: Dec. 7, 2021

(65) Prior Publication Data

US 2023/0179753 A1   Jun. 8, 2023

(51) Int. Cl.

| | |
|---|---|
| *G06T 7/73* | (2017.01) |
| *H04N 13/128* | (2018.01) |
| *G06T 7/33* | (2017.01) |
| *H04N 13/246* | (2018.01) |
| *H04N 13/239* | (2018.01) |

(Continued)

(52) U.S. Cl.
CPC ......... *H04N 13/128* (2018.05); *G02B 6/0016* (2013.01); *G02B 6/0036* (2013.01); *G02B 27/0172* (2013.01); *G06F 18/22* (2023.01); *G06T 7/33* (2017.01); *G06T 7/73* (2017.01); *H04N 13/239* (2018.05); *H04N 13/246* (2018.05); *G02B 2027/014* (2013.01);
(Continued)

(58) Field of Classification Search
CPC .. H04N 13/128; H04N 13/246; H04N 13/239; G06T 7/73; G06T 7/33; G06F 18/22; G02B 6/0016
USPC .......................................................... 348/47
See application file for complete search history.

(56) References Cited

U.S. PATENT DOCUMENTS

| | | |
|---|---|---|
| 1,736,812 A | 11/1929 | Youngblood |
| 3,121,992 A | 2/1964 | Fritz et al. |

(Continued)

FOREIGN PATENT DOCUMENTS

| | | |
|---|---|---|
| CN | 108462867 | 8/2018 |
| CN | 111652946 | 9/2020 |

(Continued)

OTHER PUBLICATIONS

"International Application Serial No. PCT/US2017/041228, International Search Report dated Nov. 2, 2017", 4 pgs.

(Continued)

*Primary Examiner* — Nguyen T Truong
(74) *Attorney, Agent, or Firm* — Schwegman Lundberg & Woessner, P.A.

(57) ABSTRACT

An optical display system has an optical waveguide combiner and one or more cameras. The one or more camera(s) is optically coupled to the optical waveguide combiner and have a field of view of at least one real object and at least one virtual object displayable by the optical display system. The one or more camera(s), which may be for example wafer level waveguide camera(s), may be disposed outside the usable field of view of an output coupler. The one or more camera(s) may be self-calibrated electronically using images captured by the cameras of one or more virtual object(s) displayable by the optical display system. AR/VR/MR registration of devices and/or displayed virtual objects with real objects may be implemented using the images captured by the one or more camera(s) of the displayed virtual objects and real world objects. Real object distance and/or spatial location relative to the optical waveguide combiners may be determined or estimated from the captured images.

27 Claims, 23 Drawing Sheets

(51) Int. Cl.
  *G06F 18/22* (2023.01)
  *F21V 8/00* (2006.01)
  *G02B 27/01* (2006.01)
(52) U.S. Cl.
  CPC ............. *G02B 2027/0138* (2013.01); *G02B 2027/0178* (2013.01)

(56) References Cited

U.S. PATENT DOCUMENTS

| | | |
|---|---|---|
| 4,220,400 A | 9/1980 | Vizenor |
| 4,232,943 A | 11/1980 | Rogers |
| 4,545,646 A | 10/1985 | Chern et al. |
| 4,767,186 A | 8/1988 | Bradley et al. |
| 4,968,117 A | 11/1990 | Chern et al. |
| 5,050,946 A | 9/1991 | Hathaway et al. |
| 5,076,664 A | 12/1991 | Migozzi |
| 5,202,950 A | 4/1993 | Arego et al. |
| 5,253,637 A | 10/1993 | Maiden |
| 5,535,025 A | 7/1996 | Hegg |
| 5,848,119 A | 12/1998 | Miyake et al. |
| 5,886,822 A | 3/1999 | Spitzer |
| 5,896,438 A | 4/1999 | Miyake et al. |
| 5,959,726 A | 9/1999 | Riley et al. |
| 5,991,085 A | 11/1999 | Rallison et al. |
| 6,057,966 A | 5/2000 | Carroll et al. |
| 6,157,291 A | 12/2000 | Kuenster et al. |
| 6,204,974 B1 | 3/2001 | Spitzer |
| 6,222,677 B1 | 4/2001 | Budd et al. |
| 6,236,511 B1 | 5/2001 | Brown |
| 6,262,019 B1 | 7/2001 | Keller et al. |
| 6,288,846 B1 | 9/2001 | Stoner, Jr. |
| 6,353,503 B1 | 3/2002 | Spitzer et al. |
| 6,563,648 B2 | 5/2003 | Gleckman et al. |
| 6,577,311 B1 | 6/2003 | Crosby et al. |
| 6,607,286 B2 | 8/2003 | West et al. |
| 6,671,100 B1 | 12/2003 | Mcruer |
| 6,714,174 B2 | 3/2004 | Suyama et al. |
| 6,829,095 B2 | 12/2004 | Amitai |
| 6,926,420 B2 | 8/2005 | Sung |
| 7,059,728 B2 | 6/2006 | Alasaarela et al. |
| 7,079,318 B2 | 7/2006 | Shikama et al. |
| 7,209,097 B2 | 4/2007 | Suyama et al. |
| 7,336,244 B2 | 2/2008 | Suyama et al. |
| 7,418,202 B2 | 8/2008 | Biernath et al. |
| 7,446,943 B2 | 11/2008 | Takagi et al. |
| 7,506,987 B2 | 3/2009 | Nilsen |
| 7,513,674 B1 | 4/2009 | Donahue |
| 7,576,916 B2 | 8/2009 | Amitai |
| 7,639,208 B1 | 12/2009 | Ha et al. |
| 7,656,585 B1 | 2/2010 | Powell et al. |
| 7,686,497 B2 | 3/2010 | Kropac et al. |
| 7,688,347 B2 | 3/2010 | Dolgoff |
| 7,703,931 B2 | 4/2010 | Nilsen |
| 7,710,655 B2 | 5/2010 | Freeman et al. |
| 7,876,489 B2 | 1/2011 | Gandhi et al. |
| 7,936,519 B2 | 5/2011 | Mukawa et al. |
| 7,944,616 B2 | 5/2011 | Mukawa |
| 7,991,257 B1 | 8/2011 | Coleman |
| 8,384,999 B1 | 2/2013 | Crosby et al. |
| 8,964,292 B1 | 2/2015 | Marason et al. |
| 8,988,463 B2 | 3/2015 | Stone Perez et al. |
| 9,252,015 B2 | 2/2016 | Wu et al. |
| 9,720,232 B2 | 8/2017 | Hua et al. |
| 10,007,115 B2 | 6/2018 | Greenhalgh et al. |
| 10,114,220 B2 | 10/2018 | Grey et al. |
| 10,191,993 B2 | 1/2019 | Ross et al. |
| 10,481,678 B2 | 11/2019 | Crispin |
| 10,488,666 B2 | 11/2019 | Leighton et al. |
| 10,623,722 B2 | 4/2020 | Markovsky et al. |
| 10,649,209 B2 | 5/2020 | Leighton et al. |
| 10,795,434 B2 | 10/2020 | Crispin |
| 2001/0021239 A1 | 9/2001 | Itoga et al. |
| 2001/0033440 A1 | 10/2001 | Togino |
| 2002/0021461 A1 | 2/2002 | Ono et al. |
| 2002/0070904 A1 | 6/2002 | Okuyama |
| 2003/0169397 A1 | 9/2003 | Reichow et al. |
| 2003/0184868 A1 | 10/2003 | Geist |
| 2005/0094292 A1 | 5/2005 | Cahall et al. |
| 2006/0119794 A1 | 6/2006 | Hillis et al. |
| 2006/0132914 A1 | 6/2006 | Weiss et al. |
| 2007/0008624 A1 | 1/2007 | Hirayama |
| 2007/0177275 A1 | 8/2007 | Mcguire, Jr. |
| 2009/0051879 A1 | 2/2009 | Vitale et al. |
| 2009/0167651 A1 | 7/2009 | Minano et al. |
| 2010/0103078 A1 | 4/2010 | Mukawa et al. |
| 2010/0149073 A1 | 6/2010 | Chaum et al. |
| 2010/0278480 A1 | 11/2010 | Vasylyev |
| 2010/0290127 A1 | 11/2010 | Kessler et al. |
| 2010/0321409 A1 | 12/2010 | Komori et al. |
| 2011/0007277 A1 | 1/2011 | Solomon |
| 2011/0050655 A1 | 3/2011 | Mukawa |
| 2011/0083741 A1 | 4/2011 | Munro |
| 2011/0083742 A1 | 4/2011 | Munro |
| 2011/0155331 A1 | 6/2011 | Lopin |
| 2011/0157600 A1 | 6/2011 | Lyon |
| 2011/0213664 A1 | 9/2011 | Osterhout et al. |
| 2011/0221656 A1 | 9/2011 | Haddick et al. |
| 2011/0226332 A1 | 9/2011 | Ford et al. |
| 2011/0227813 A1 | 9/2011 | Haddick et al. |
| 2011/0255303 A1 | 10/2011 | Nichol et al. |
| 2011/0286222 A1 | 11/2011 | Coleman |
| 2012/0002294 A1 | 1/2012 | Dobschal et al. |
| 2012/0002295 A1 | 1/2012 | Dobschal et al. |
| 2012/0050493 A1 | 3/2012 | Ernst et al. |
| 2013/0147686 A1 | 6/2013 | Clavin et al. |
| 2013/0235191 A1 | 9/2013 | Miao et al. |
| 2013/0242392 A1 | 9/2013 | Wang et al. |
| 2014/0153102 A1 | 6/2014 | Chang |
| 2015/0205126 A1 | 7/2015 | Schowengerdt |
| 2016/0109708 A1 | 4/2016 | Schowengerdt |
| 2016/0154244 A1 | 6/2016 | Border et al. |
| 2016/0270656 A1 | 9/2016 | Samec et al. |
| 2017/0295362 A1 | 10/2017 | Travis |
| 2018/0018791 A1 | 1/2018 | Guoyi |
| 2020/0049998 A1 | 2/2020 | Leighton et al. |
| 2020/0183174 A1 | 6/2020 | Noui et al. |
| 2020/0225400 A1 | 7/2020 | Stannard |
| 2020/0233218 A1 | 7/2020 | Leighton et al. |
| 2020/0278553 A1 | 9/2020 | Leighton et al. |
| 2021/0055788 A1 | 2/2021 | Crispin |
| 2021/0063744 A1 | 3/2021 | Maric et al. |
| 2021/0099691 A1 | 4/2021 | Danziger |
| 2021/0272328 A1 | 9/2021 | Navab et al. |

FOREIGN PATENT DOCUMENTS

| | | |
|---|---|---|
| EP | 0785457 | 7/1997 |
| EP | 1798592 | 6/2007 |
| EP | 3355315 | 8/2018 |
| RU | 2069835 | 11/1996 |
| TW | I271580 | 1/2007 |
| WO | 02099509 | 12/2002 |
| WO | 2007019138 | 2/2007 |
| WO | M07014371 | 2/2007 |
| WO | 2007062098 | 5/2007 |
| WO | 2008109420 | 9/2008 |
| WO | 2008110942 | 9/2008 |
| WO | 2010033859 | 3/2010 |
| WO | 2010062481 | 6/2010 |
| WO | 2010106248 | 9/2010 |
| WO | 2010123934 | 10/2010 |
| WO | 2011124897 | 10/2011 |
| WO | 2011130715 | 10/2011 |
| WO | 2018009885 | 1/2018 |
| WO | 2018166006 | 9/2018 |
| WO | 2019004565 | 1/2019 |
| WO | 2020123018 | 6/2020 |
| WO | 2020123561 | 6/2020 |
| WO | 2020146683 | 7/2020 |
| WO | 2023107845 | 6/2023 |

(56) References Cited

OTHER PUBLICATIONS

"International Application Serial No. PCT/US2017/041228, Written Opinion dated Nov. 2, 2017", 9 pgs.
"International Application Serial No. PCT/US2019/065551, International Search Report dated Feb. 21, 2020", 2 pgs.
"International Application Serial No. PCT/US2019/065551, Written Opinion dated Feb. 21, 2020", 9 pgs.
"International Application Serial No. PCT/2019/055198, International Search Report dated Jan. 9, 2020", 2 pgs.
"International Application Serial No. PCT/US2019/055198, Written Opinion dated Jan. 9, 2020", 3 pgs.
"International Application Serial No. PCT/US2020/012995, International Search Report dated May 19, 2020", 2 pgs.
"International Application Serial No. PCT/US2020/012995, Written Opinion dated May 19, 2020", 8 pgs.
"U.S. Appl. No. 15/206,111, Non-Final Office Action dated Mar. 15, 2018", 19 pgs.
"U.S. Appl. No. 15/206,111, Final Office Action dated Feb. 19, 2019", 18 pgs.
"U.S. Appl. No. 15/206,111, Restriction Requirement dated Nov. 3, 2017", 6 pgs.
"U.S. Appl. No. 14/825,148, Non-Final Office Action dated Aug. 10, 2017", 19 pgs.
"U.S. Appl. No. 15/404,172, Non-Final Office Action dated Oct. 3, 2018", 26 pgs.
"U.S. Appl. No. 15/893,599, Non-Final Office Action dated Jan. 31, 2019", 18 pgs.
"U.S. Appl. No. 15/893,599, Final Office Action dated Aug. 8, 2019", 24 pgs.
"U.S. Appl. No. 16/658,078, Non-Final Office Action dated Apr. 24, 2020", 25 pgs.
"U.S. Appl. No. 16/596,648, Non-Final Office Action dated Feb. 3, 2020", 26 pgs.
"U.S. Appl. No. 16/739,103, Decision on Petition dated Aug. 27, 2020", 2 pgs.
"U.S. Appl. No. 14/825,148, Restriction Requirement dated Mar. 1, 2016", 9 pgs.
"International Application Serial No. PCT/US2016/041588, International Search Report dated Oct. 24, 2016", 2 pgs.
"International Application Serial No. PCT/US2016/041588, Written Opinion dated Oct. 24, 2016", 8 pgs.
Aye, Tin M, "Miniature Guided Light Array Sequential Scanning Display for Head Mounted Displays", Final Report to US Army CECOM, [Online] Retrieved from the Internet: <URL: http://handle.dtic.mil/100.2/ADA350745>, (May 15, 1998), 35 pgs.
"International Application Serial No. PCT/US2022/080699, International Search Report dated Apr. 11, 2023", 4 pgs.
"International Application Serial No. PCT/US2022/080699, Written Opinion dated Apr. 11, 2023", 9 pgs.
"International Application Serial No. PCT/US2022/080699, Article 19 Amendments filed Jun. 9, 2023", 20 pgs.

OPTICAL WAVEGUIDE COMBINER SYSTEMS AND METHODS

TECHNICAL FIELD

The present invention relates to optical display systems and, in particular but not exclusively, to optical waveguide combiner systems. Additionally or alternatively, embodiments relate to methods for camera calibration in optical display systems. Additionally or alternatively, embodiments relate to apparatus and/or methods for registration of one or more virtual objects in virtual reality and/or augmented reality display systems.

BACKGROUND

The utilisation of virtual reality and augmented reality display systems has increased in recent years, with such devices being used for both personal and commercial/industrial purposes. Devices may be used in monocular or binocular formats and may be used for purposes ranging from monochrome display of simple iconography, through presentation of text based instructions to full video display. When such devices are used to supplement a real-world scene with computer generated images, the display system needs to accurately display virtual or augmented reality content in context.

SUMMARY

According to some aspects of the present technology, an optical display system is provided. The optical display system may comprise an optical waveguide combiner and a plurality of cameras. The optical waveguide combiner may comprise a waveguide optical substrate, an optical input coupler on, in or adjacent the waveguide optical substrate; and an optical output coupler on or in the waveguide optical substrate. The optical input coupler may be coupled via the waveguide optical substrate to the optical output coupler. The plurality of cameras may comprise a first camera and a second camera. The first camera may be optically coupled to the output coupler and has a first field of view of one or more virtual object displayable at an image plane by the optical waveguide combiner. The displayable virtual object(s) may be in the field of view of an eyebox of the optical waveguide combiner. The second camera may be optically coupled to the output coupler and has a second field of view of the virtual object(s) displayable by the optical waveguide combiner. At the image plane, a combined field of view of the first camera and the second camera may comprise the first field of view of the first camera and the second field of view of the second camera and may include an overlapping region of the first field of view and the second field of view. At the image plane, the displayable one or more virtual object(s) may be within the combined field of view of the of the first camera and the second camera.

In some embodiments, the optical waveguide combiner is see-through. The one or more real object may be viewable within the combined field of view of the first camera and the second camera.

In some embodiments, at the image plane, the field of view of the eyebox and/or field of view of the projector is within the combined field of view of the first and second cameras.

In some embodiments, the plurality of cameras are located in a region outside the field of view of an eyebox of the optical waveguide combiner system.

In some embodiments, the output coupler comprises a pre-exit pupil expansion region and an exit pupil expansion region. The first camera and the second camera may be optically coupled to the pre-exit pupil expansion region.

In some embodiments, the system further comprises a projector configured to project a display image of the virtual object(s) into the input coupler.

In some embodiments, the system further comprises one or more processor(s) operably coupled to the projector and the first camera and the second camera. The one or more processor(s) may be configured to cause the projector to project a display image of the virtual object(s) which includes fiducials, wherein the fiducials of the displayable virtual object(s) are within the overlapping region of the first field of view of the first camera and the second field of view of the second camera. The one or more processor(s) is configured to electronically stitch together first and second images captured from the first and second cameras, respectively, by adjusting the first and second images to align the fiducials in the first image with the fiducials in the second image.

In some embodiments, output coupler comprises any one or combination of prism arrays, cascaded mirrors, diffractive gratings and holograms. The output coupler may comprise optical diffractive elements.

In some embodiments, the optical diffractive elements may comprise two diffractive optical elements at least partially overlaid on one another in or on the waveguide substrate.

In some embodiments, the output coupler comprises a combined 2D expansion output diffractive grating.

In some embodiments, each of the plurality of cameras may comprise a wafer level camera. The wafer level camera is incorporated in or on the optical waveguide combiner.

In some embodiments, the optical input coupler comprises an optical input diffractive grating, and wherein the optical input diffractive grating is in optical communication with the optical output grating without any intermediate optical diffractive grating therebetween.

In some embodiments, the optical waveguide combiner is incorporated in an eyepiece of a pair of eyeglasses.

According to some aspects of the present technology, there is provided a method of camera calibration for an AR/MR/VR display. The method may comprise projecting into an optical waveguide combiner a display image including fiducials, optically coupling first and second cameras to an output of the optical waveguide combiner, the first and second cameras having a combined field of view comprising a first field of view of the first camera and a second field of view of the second camera and including an overlapping region of the first field of view and the second field of view; displaying, by the optical waveguide combiner, at an image plane, the display image as a virtual image with the fiducials, wherein the displayed virtual image is within the combined field of view of the first camera and the second camera, wherein the fiducials of the displayed virtual image at the image plane are within the overlapping region of the first field of view and the second field of view; capturing by the first camera a first image of the virtual image; capturing by the second camera a second image of the virtual image; and electronically stitching the captured first image and second image together; wherein electronically stitching the captured first image and second image together comprises electronically adjusting the captured first image and captured second image by moving the captured first image and the captured second image to align the fiducials of the first image with the fiducials of the second image.

In some embodiments, electronically stitching the captured first image and second image together further comprises determining the overlapping region of the first field of view and the second field of view by comparing the adjusted first and second images with the display image projected into the combiner; and electronically correcting the adjusted first and second images according to the determined overlapping region.

In some embodiments, optically coupling the first camera and the second camera to the output of the optical waveguide combiner comprises optically coupling the first camera and the second camera to a pre-exit pupil expansion output of an output coupler of the optical waveguide combiner.

According to aspects of the present technology, there is provided a method of registering a VR/AR/MR display. The method may comprise: providing one or more virtual object(s) for display; projecting into an optical waveguide combiner a display image of the virtual object(s); displaying, by the optical waveguide combiner, the display image as the virtual object(s); capturing an image of the displayed virtual object(s) and real world scene using one or more optical camera(s), the camera(s) being optically coupled to an output of the optical waveguide combiner and having a field of view of the real world scene and of the displayed virtual object(s); comparing, using the captured image, the virtual object(s) to one or more real object(s) of the real world scene; determining a registration error between the virtual object(s) and the real object(s) based on the comparison; adjusting the virtual object(s) being displayed to substantially correct the registration error.

In some embodiments, comparing, using the captured image, the virtual object(s) with the real object(s) comprises identifying a common feature or fiducial in the virtual object(s) and the real object(s); and comparing the identified common feature or fiducial in the virtual object(s) with the identified common feature or fiducial in the real object(s); wherein determining a registration error between the virtual object(s) and the real object(s) based on the comparison comprises determining a difference in the position of the common feature or fiducial identified in the virtual object(s) and the position of the common feature or fiducial identified in the real object(s); and wherein adjusting the position of the virtual object(s) being displayed to substantially correct the registration error comprises adjusting any one or combination of size, shape and position of the virtual object(s) whereby the common feature or fiducial identified in the virtual object(s) and the common feature or fiducial identified in the real object(s) substantially coincide.

In some embodiments, providing the virtual object(s) comprise generating a virtual object from a real object using external sensors.

According to some aspects of the present technology, there is provided a method of registering a VR/AR/MR display. The method may comprise generating or providing one or more virtual object(s) of known size; based on an estimated distance of one or more real object(s) from an optical waveguide combiner, scaling the virtual object(s) for display by the optical waveguide combiner; projecting into the optical waveguide combiner a display image of the scaled virtual object(s); displaying, by the optical waveguide combiner, the display image as the virtual object(s); capturing the displayed virtual object(s) and real object(s) using one or more optical camera(s), the or each camera having a field of view of the real object(s) and of the displayed virtual object(s); comparing, using the captured image, the real object(s) to the virtual object(s); determining a registration error between the virtual object(s) and the real object(s) based on the comparison; and adjusting the virtual object(s) being displayed to substantially correct the registration error.

In some embodiments, comparing the captured virtual object(s) to the real object(s) comprises determining from the captured image an angular size and/or angle of the one or more real object(s) from the point of view of the camera(s); determining from the captured image an angular size and/or angle of the one or more virtual object(s) from the point of view of the camera(s); and wherein determining a registration error between the virtual object(s) and the real object(s) based on the comparison comprises determining the difference in angular size and/or angle of the one or more virtual object(s) relative to the one or more real object(s); and wherein adjusting the virtual object(s) being displayed to substantially correct the registration error comprises adjusting any one or combination of the size, shape and spatial location of the one or more virtual object(s) whereby the one or more virtual object(s) appear(s) substantially in the same spatial location as the real object when viewed from the eyebox.

According to the present technology, there is provided a method of registration of a VR/MR/AR display system. The method may comprise: capturing stereo images using first and second optical camera(s) of a binocular system, the first and second cameras being optically coupled to respective outputs of first and second optical waveguide combiners of the binocular system and having a field of view of one or more displayable virtual object(s) and of one or more real object(s); determining an estimated distance of the real object(s) from the optical combiners using the optical cameras and/or estimated spatial location of the real object(s) using the optical cameras; generating the virtual object(s) for display by the optical waveguide combiners based on the estimated distance and/or estimated spatial location; projecting into the optical waveguide combiners a display image of the virtual object(s); displaying, by the optical waveguide combiners, the display image as the virtual object(s); capturing an image of the displayed virtual object(s) and real object(s) using the optical cameras; comparing the displayed virtual object(s) to the real object(s) using the captured image; determining a registration error between the real object(s) and the virtual object(s) based on the comparison; adjusting the virtual object(s) being displayed to substantially correct the registration error.

In some embodiments, determining an estimated distance of the real object(s) from the optical combiner(s) using the optical cameras comprises: extracting from the captured images of the real object(s) a virtual image representing the real object(s); recognizing the extracted virtual object(s); determining depth perception cues from the images captured by the optical cameras; estimating the distance of the real object(s) from the optical waveguide combiners based on the determined depth perception cues and object recognition.

In some embodiments, determining a registration error between the real object(s) and the virtual object(s) based on the comparison comprises: determining the difference in spatial location between the displayed virtual object(s) and the real object(s) from the binocular disparity in the stereo images.

According to some aspects of the present technology, there is provided a method of determining distance in an AR/MR/VR display. The method may comprise: capturing stereo images using optical camera(s) for a binocular optical waveguide combiner system, the optical cameras having a field of view of one or more displayable virtual object(s) and of one or more real object(s); extracting from the captured images of the real object(s) one or more virtual object(s)

representing the real object(s); recognizing the extracted virtual object(s); determining depth perception cues from the images captured by the optical cameras; determining the distance of the real object(s) from the optical combiners based on the determined depth perception cues and object recognition.

According to some aspects of the present technology, there is provided a method of determining distance in an AR/MR/VR display. The method may comprise generating or providing one or more virtual object(s) for display; projecting into the optical waveguide combiners of a binocular optical combiner system a display image of the virtual object(s); displaying in stereo, by the optical wave combiners, the display image as a virtual object(s); capturing stereo images of the displayed virtual object(s) and one or more real object(s) using one or more optical camera(s) incorporated into each optical waveguide combiner of the binocular system, the one or more camera(s) having a field of view of the real object(s) and of displayed virtual object(s); comparing the displayed virtual object(s) to the real object(s) using the captured stereo images; determining the binocular disparity in the stereo images; and determining the distance of the real object(s) from virtual object(s) according to the binocular disparity.

In some aspects of the present technology, there is provided a non-transitory, computer-readable medium comprising program instructions, the program instructions, when executed by one or more processors of a computer system, cause the one or more processors and/or the optical display system to perform any one or any combination of actions and/or method steps described herein.

In some embodiments, the present technology is directed to a system of one or more computers which can be configured to perform particular operations or actions by virtue of having software, firmware, hardware, or a combination of these installed on the system that in operation causes or cause the system to perform the actions and/or method steps described herein. An example system can comprise one or more processor; and a memory, the processor executing instructions stored in the memory to cause the one or more processors and/or the optical display system to perform actions and/or method steps described herein.

DETAILED DESCRIPTION OF PREFERRED EMBODIMENTS

Figure 1:
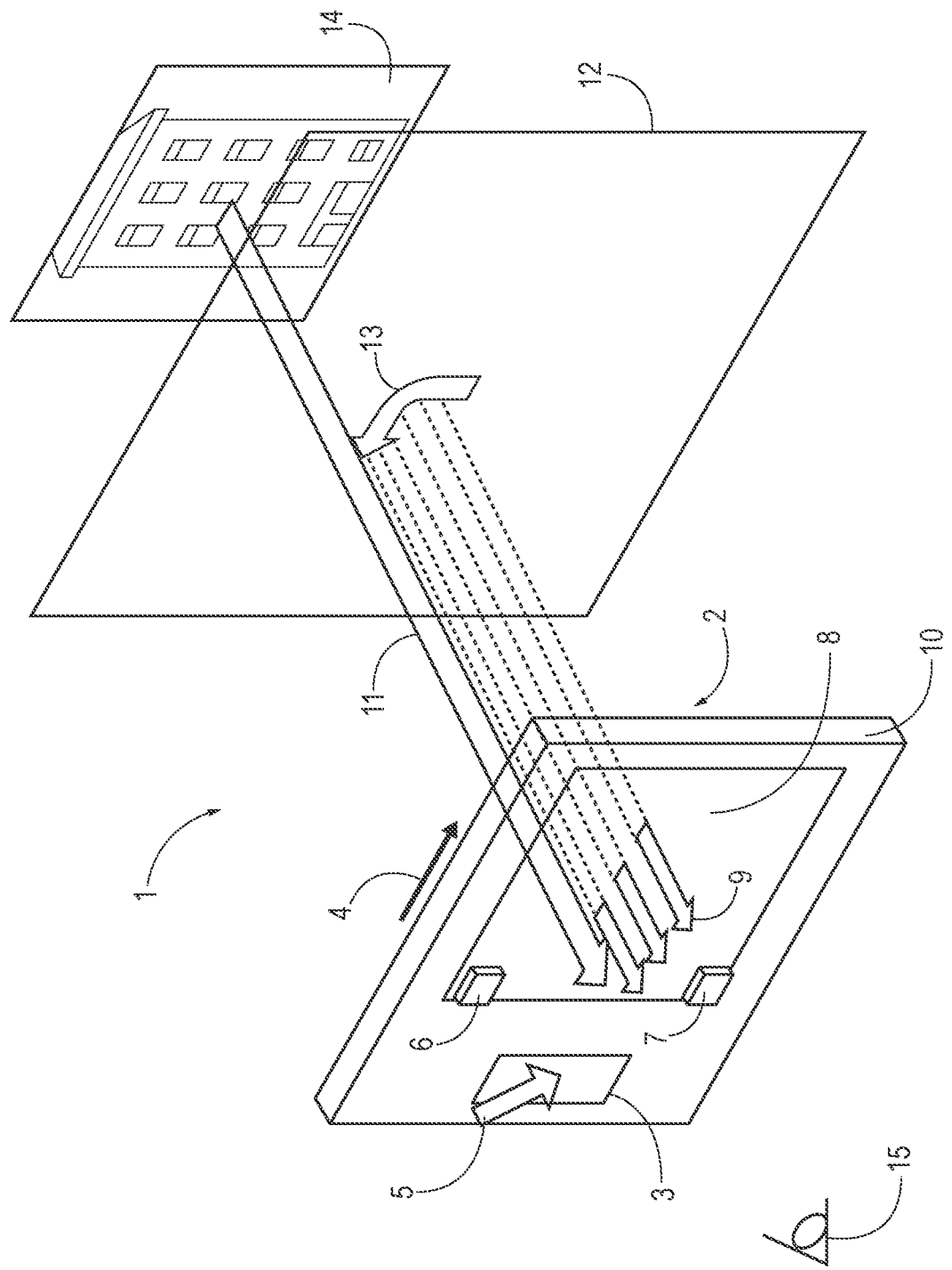
FIG. 1 illustrates a perspective view of an optical waveguide combiner system according to some aspects of the present technology.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Applicant has identified herein one or more important technical problems with optical systems that are used in virtual reality (VR), mixed reality (MR) and/or augmented reality (AR) display, such as but not limited to head mounted displays, including near to eye displays. In AR/MR/VR display systems, cameras and sensors are configured to build up a 3-D map of the real world, which is then used to calculate imagery to describe the outside world in angle space. However, uncertainty in display angle and position leads to errors in projected boresight and parallax errors. For these reasons, AR and VR displays require accurate registration of sensors and/or cameras to the projector/display system. In AR displays, virtual objects need to be in registration with real objects in the real world. For these reasons, accurate registration techniques need to be adopted in AR and VR displays.

Accurate mechanical registration may not be desirable or possible in some applications. There is a need to relax the physical registration requirements in applications where the cameras/sensors may move independently from the display. One such example is a bomb disposal suit in which the display is attached to an inner helmet of the suit and the sensors are attached to an outer visor which moves independently from the inner helmet. Furthermore, in some applications, mechanical tolerancing and build complexity issues further complicate physical registration. For example, stowable displays, or sensors associated with a head mounted display that are designed to be moveable to reduce head borne weight, are inherently difficult to register.

Lack of accurate registration results in poor or unworkable devices. By way of non-limiting example, a processor connected to the AR display may be configured to cause the AR display to display virtual navigational icons that would appear superimposed over the real world view observed through the waveguide, thus providing a wearer of the AR display with visual guidance on how to reach a desired destination. The presentation of such navigational icons may accommodate a degree of error with respect to scale or size within the AR display, since they do not relate to a real world object, but rather indicate turn left, right or go straight on when approaching a junction. However, the GPS may suffer with general positional accuracy depending on the surroundings in which the wearer is seeking to navigate, in which case there may be some discrepancy in what the wearer sees through the display and the icons superimposed via the AR display. In other circumstances the AR system may be intended to superimpose virtual images, representing one of more aspects of real world objects, over the corresponding real world objects viewed through the device. For example, image data from a night vision sensor of poorly illuminated or dark terrain seen through an AR display can be superimposed on the AR display together terrain information from a depth imaging sensor to allow the wearer to navigate that terrain. Unlike the previous GPS icon driven navigation application example; using data from night vision or depth sensors requires more accurate calibration and registration of the AR display, the absence of which may result in a wearer colliding with an object in the real world being wrongly represented within the AR image. It has been recognized that accurate calibration and registration of the AR display is needed.

The aforementioned problems can be mitigated by aspects of the present technology which allow for optical systems and methods that provide improved or alternative approaches for device calibration and virtual model registration in virtual reality, mixed reality and/or augmented reality display systems. Optical systems and methods according to aspects of the present technology will now be described in more detail for use in some exemplary augmented reality and virtual reality display systems. However, it will be appreciated that in some other aspects and embodiments, the present technology can be configured for augmented reality, mixed reality and/or virtual reality systems other than those shown in the examples and even for other types of optical delivery systems.

Technical features described in this application can be used to construct various aspects of optical waveguide combiner systems and methods. In some approaches, an optical display system has an optical waveguide combiner and one or more cameras. The one or more cameras may be optically coupled to an output of the optical waveguide combiner and have a field of view of one or more real objects and/or one or more virtual objects displayable by the optical display system. A plurality of wafer level waveguide cameras may be disposed outside the usable field of view of an output coupler. The plurality of waveguide cameras may be self-calibrated electronically using images captured by the waveguide cameras of the virtual object(s) displayable by the optical display system.

Furthermore, technical features described in this application can be used to construct various aspects of AR, MR and/or VR display registration methods and systems. In some approaches, AR/VR/MR registration of devices and/or displayed virtual objects with real objects may be implemented using the images of the displayed virtual objects and real world objects captured by one or more cameras optically coupled to the waveguide combiner(s) of the display device. Real object distance from the optical waveguide combiners and/or spatial location may be determined or estimated from the captured images.

Reference will now be made to the drawings in which the various elements of embodiments will be given numerical designations and in which embodiments will be discussed so as to enable one skilled in the art to make and use the present technology.

Specific reference to components, process steps, and other elements are not intended to be limiting. Further, it is understood that like parts bear the same reference numerals, when referring to alternate figures.

It will be further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

Referring to FIG. 1 of the accompanying drawings, an optical display system 1 for a near-to-eye augmented reality display system according to one aspect of the present technology comprises an optical waveguide combiner 2 and a plurality of cameras 6,7. In the embodiment of FIG. 1, optical waveguide combiner 2 is a see-through combiner for augmented or mixed reality applications. However, in some other embodiments, the optical waveguide combiner may be non-see-through such as for VR applications.

Optical waveguide combiner 2 comprises a waveguide optical substrate 10, an optical input coupler 3 on, in or adjacent the waveguide optical substrate 10 and an optical output coupler 8 on or in the waveguide optical substrate 10. The optical input coupler 3 is optically coupled via a portion of waveguide optical substrate 10 to optical output coupler 8. An optical input, which comprises collimated display image rays 5, is receivable by optical input coupler 3. The receivable display image rays 5 are input coupled by optical input coupler 3 into the waveguide optical substrate 10. Images rays 5 are guided along the waveguide to output coupler 8 by means of total internal reflection in the waveguide.

Waveguide optical substrate 10 is made from transparent waveguide materials such as but not limited to glass, plastic or other suitable materials. Waveguide optical substrate 10 is a slab or planar type waveguide substrate. In some other embodiments, waveguide optical substrate 10 may be curved or may have other shapes and configurations and have bent or curved axes.

Progressive extraction of display image rays 5 as output image rays 9 along waveguide optical substrate 10 in the exit pupil expanding direction 4 is achieved by output coupler 8. Output coupler 8 output couples display image rays 5 to an eye 15 of an observer.

Various optical input couplers and coupling methods are possible. In the embodiment shown in FIG. 1, optical input coupler 3 is a diffractive input coupler integrated in the waveguide. In some other embodiments, optical input coupler 3 comprises or includes one or more diffraction optical elements separate from the waveguide substrate. In some other embodiments, optical input coupler 3 includes a reflective mirror incorporated in the waveguide to reflectively couple optical input rays injected into the side of substrate into the waveguide. In yet some other embodiments, optical input coupler 3 includes one or more other optical coupling components integrated with or separate from waveguide optical substrate 10 for coupling optical input 5 into the waveguide. By way of example, such optical coupling components may be a prism or lens system.

Output coupler 8 is a diffractive output coupler. Diffractive output coupler comprises diffractive elements. The diffractive elements comprise gratings. In some other embodiments, the diffractive elements comprise photonic crystals. In some other embodiments, output coupler 8 may be a mirror or a series of mirrors/reflectors or cascaded mirrors/reflectors, prism arrays, holograms or a combination thereof.

The display virtual image formed by output rays 9 is a virtual object 13 displayable at image plane 12 at a spatial position relative to a real object 14 such that virtual object 13 and real object 14 are viewable through optical waveguide combiner 2 by eye 15 and appear superimposed. In waveguide based displays, the selected initial focal plane is at infinity so as not to forfeit resolution. This is because a waveguide maintains angular information and not positional information. Typically, the displayed image exists as a virtual image at image or focal plane 12 about three metres in front of optical waveguide combiner 2. This is notionally equivalent to existing at an infinite distance due to the angular position the eyes would adopt being essentially the same when observing an object about 3 metres away versus for example one that is 100 metres or more away. In FIG. 1, virtual object 13 being displayed is a navigation icon but it will be understood that this is merely one example of a virtual object. In some embodiments, virtual object 13 represents real object 14 that the virtual object is intended to overlay or superimpose.

A plurality of cameras 6, 7 are optically coupled to an output of the optical coupler. In the embodiment of FIG. 1, the plurality of cameras is incorporated in or on the optical waveguide substrate within a region of the output coupler 8. The plurality of cameras comprises a first camera 6 and a second camera 7 spaced apart from first camera 6. The cameras 6,7 may be spatially separated on or in proximity to the waveguide surface such that they are within a portion of the field of view (FOV) of the output coupler 8. In some other embodiments, the cameras may be located in other positions and/or there may be one camera or more than two cameras. Each camera is an ultra small camera having dimensions in the mm or sub mm region such as a wafer level camera module. One non-limiting example of such as camera is OVM6948 CameraCubeChip (dimensions being 0.65 mm×0.65 mm×1.16 mm).

Figure 2:
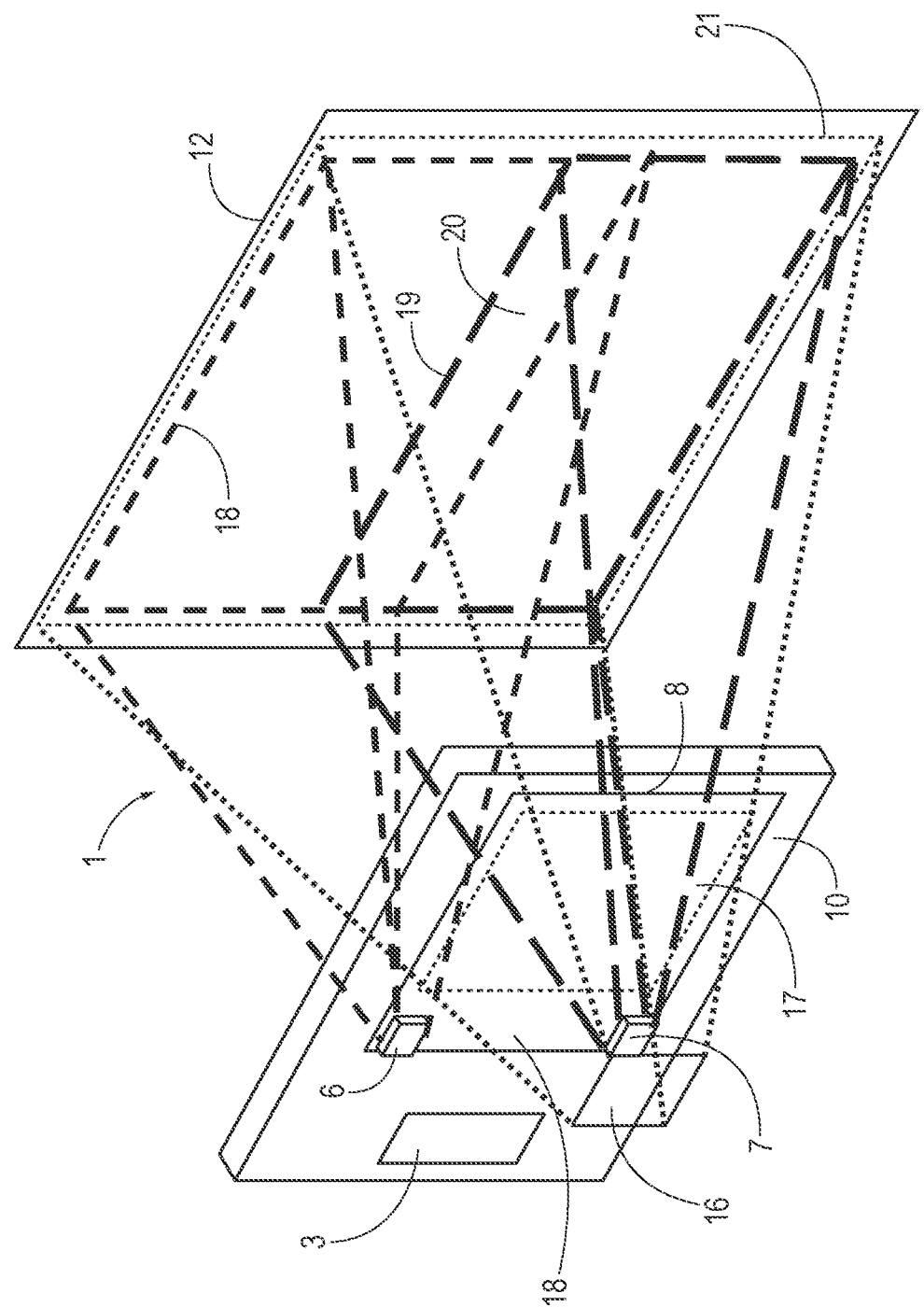
FIG. 2 illustrates a perspective view of the optical waveguide combiner system of FIG. 1 illustrating overlapping fields of view of different optical elements of the system according to some embodiments.

FIG. 2 is a perspective view of optical display system 1 illustrating overlapping fields of view of different elements of the system. Although not drawn to scale, FIG. 2 illustrates the relationship between the overlapping regions of the field of views of the first camera 6, second camera 7 and eyebox 16. Output coupler 8 has a surface area usable by eyebox 16 that is less than the entire surface area of output coupler 8. Eyebox 15 has a field of view 17 at the output coupler 8 (usable surface area of the output coupler 8) and a field of view 21 at image plane 12 of virtual object 13. Each camera 6,7 is positioned in a region of output coupler 8 beyond the eyebox useable area of the output coupler, that is, outside the eyebox field of view 17 of output coupler 8 such that the cameras are not viewable from eyebox 16. First camera 6 has a first field of view 18 at image plane 12. Second camera 7 has a second field of view 19 at image plane 12. Each camera 6,7 is arranged spaced apart with a point of view such that, at image plane 12, first field of view 18 is adjacent to and overlaps second field of view 19. First and second cameras 6,7 therefore have a combined field of view at the image plane which comprises first field of view 18 and second field of view 19 and which includes an overlapping region 20 of first field of view 18 and second field of view 19. Field of view 21 of the eyebox at image plane 12 is substantially within the combined field of view of first and second cameras 6,7. Splitting and arranging camera fields of view in this manner enables ultra small cameras, such as wafer level cameras, to be adopted for camera imaging in optical waveguide combiner 2 and allows electronic self calibration of the cameras. Furthermore, since waveguide cameras 6,7 have a field of view of both the virtual object 13 and real world object 14, registration of virtual object 13 with real object 14 and/or registration of the system with external sensors/cameras is possible using waveguide cameras 6,7.

Each camera 6,7 is positioned such that it has a field of view equivalent to more than 50% of the field of view of a projector which projects the display image rays 5 into combiner 2. Whilst cameras 6,7 are shown in the accompanying figures as being arranged symmetrically with similar FOVs, in other embodiments, the cameras may be arranged asymmetrically and/or may have field of views different from each other and/or there may be more than two cameras (provided the images captured by the cameras can be stitched to form the larger virtual image). In some embodiments, one of the cameras has a field of view that is greater than 50% of the field of view of the projector and the field of view of the other camera may be less than 50% of the projector field of view provided there is an overlapping region 20 sufficient for image stitching. By way of non-limiting example, for the case of two cameras, one camera may have a field of view of 31% of the projector field of view and another 71% giving 100% and some overlap to complete image stitching.

In some other embodiments, only one camera is optically coupled to output coupler 8 of optical combiner 2 and field of view 21 of eyebox 16 at image plane 12 is substantially within the field of view of the camera. In yet some other embodiments, only part of field of view 21 of eyebox 16 in which virtual object(s) 13 is displayable at image plane 12 is within the field of view of the camera or within the combined field of view of the cameras. In yet some other embodiments, the field of view of the camera or the combined field of view of the cameras at the image plane substantially matches the field of view of the eyebox.

In some alternative embodiments, the one or more camera(s) is optically coupled to the exit-pupil expansion output of the output coupler. In some other embodiments, the one or more camera(s), optically coupled to the output of the output coupler, is located adjacent or remote from the waveguide substrate rather than being incorporated directly in or on the waveguide substrate. For example, in some embodiments the one or more camera(s) is located in the eyebox or even behind the eyebox.

Figure 3:
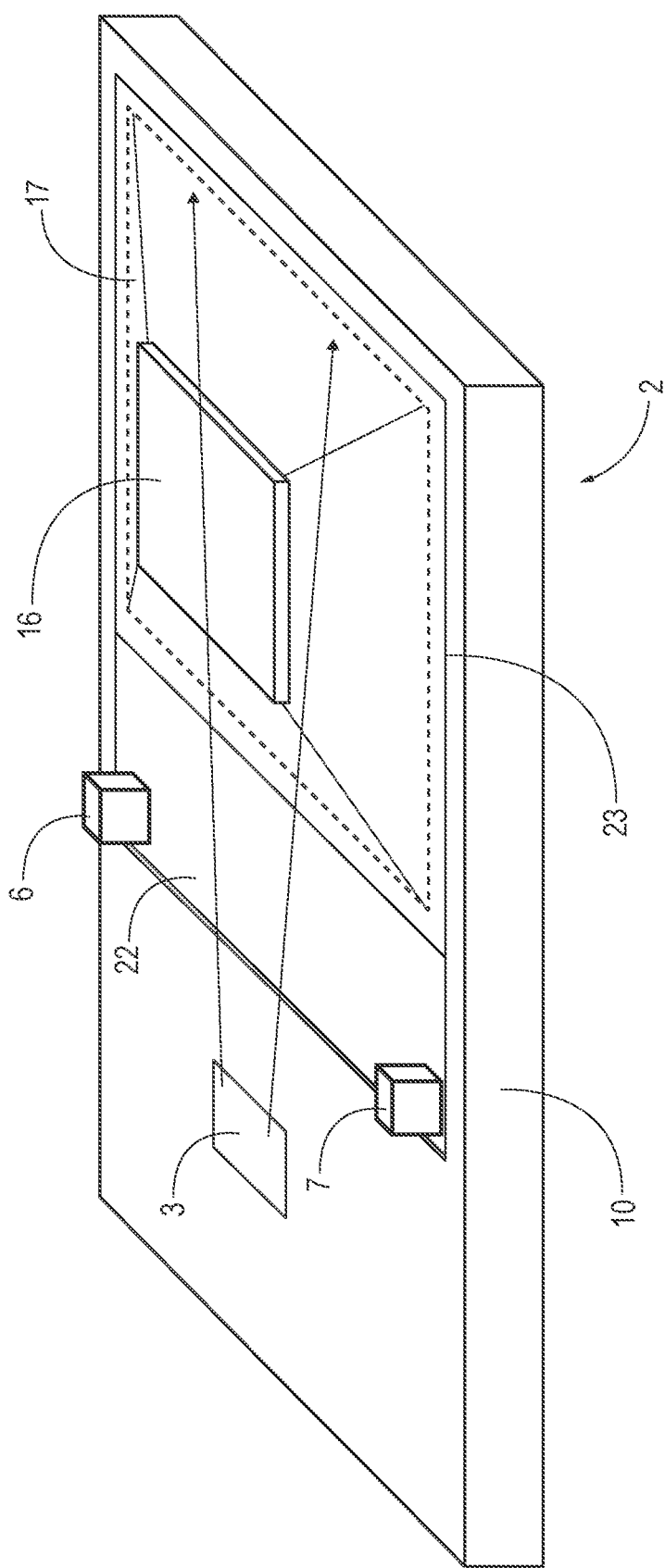
FIG. 3 illustrates a perspective view of an optical waveguide combiner system according to some embodiments.

As best shown in FIG. 3, which illustrates a perspective view of optical waveguide combiner 2 according to some embodiments, output coupler 8 can have a pre exit pupil expansion region 22 and an exit pupil expansion region 23. In the embodiment shown in FIG. 3, output coupler 8 is a combined 2D expansion and output grating on a major surface or within the waveguide configured to receive image rays 5 from input coupler 3 (input grating) and display the image. In FIG. 3, eyebox 16 is projected to the output grating for a given field of view. The output grating is a crossed diffractive grating in which two diffractive gratings overlay each other. Two diffractive gratings are entirely overlaid on one another in or on the waveguide, wherein each of the two diffractive optical elements is configured to receive light from the input diffractive grating and couple it towards the other diffractive grating which can then act as an output diffractive grating providing outcoupled orders towards a viewer. One example of an optical waveguide combiner using such an output grating is recited in U.S. Pat. No. 1,014,220B2, filed Jul. 28, 2015 and issued Oct. 10, 2018 in the name of Wave Optics Ltd and entitled "Exit pupil expanding diffractive optical waveguiding device", the entire contents of which is incorporated herein by reference. In some embodiments, the diffractive optical elements of the diffractive output coupler can be a photonic crystal rather than diffraction gratings.

Cameras 6,7 are located outside a regular usable area of output coupler 8, where the complete field of view is not available. Extracted image rays from pre-expansion area are not used for viewing the virtual object image from the eyebox. The output grating causes replication of the entrance pupil at the input of the waveguide combiner into a plurality of exit pupils. The pre-expansion region causes initial spreading of the pupil of image rays across the surface of the output grating to replicate the entrance pupil and the expansion region expands the exit pupil so that the output grating directs image rays towards the eyebox for receiving by an eye of the observer. The pre-expansion region is defined as where pupil replication has not yet fully filled the eye box, but some incomplete image information is still projected 'forward'. As the eye of a person looking through the waveguide moves through a range of angles in the eyebox, for example looking up, down, left, right, because eyebox 16 carries multiple exit pupils of image rays, the person perceives the image across the entire area of the eyebox as their eye scans through a range of viewing angles.

Figure 5:
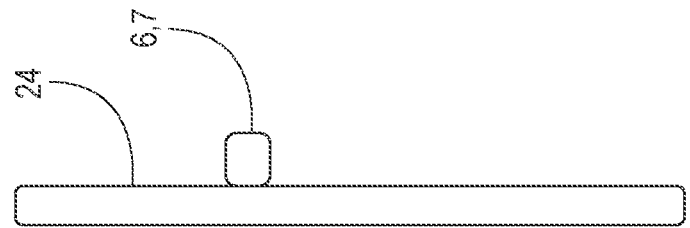
FIG. 5 illustrates a side view of the optical waveguide combiner system of FIG. 4 according to some embodiments.
Figure 4:
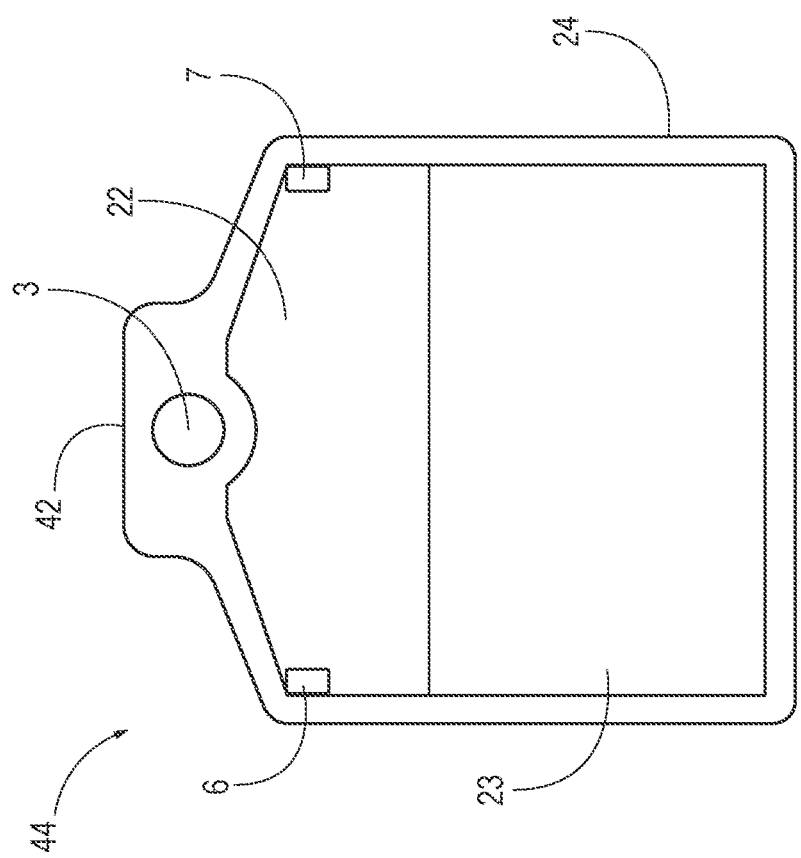
FIG. 4 illustrates a plan view of a rear side of the optical waveguide combiner system formed to fit an eyepiece according to some embodiments.
Figure 6:
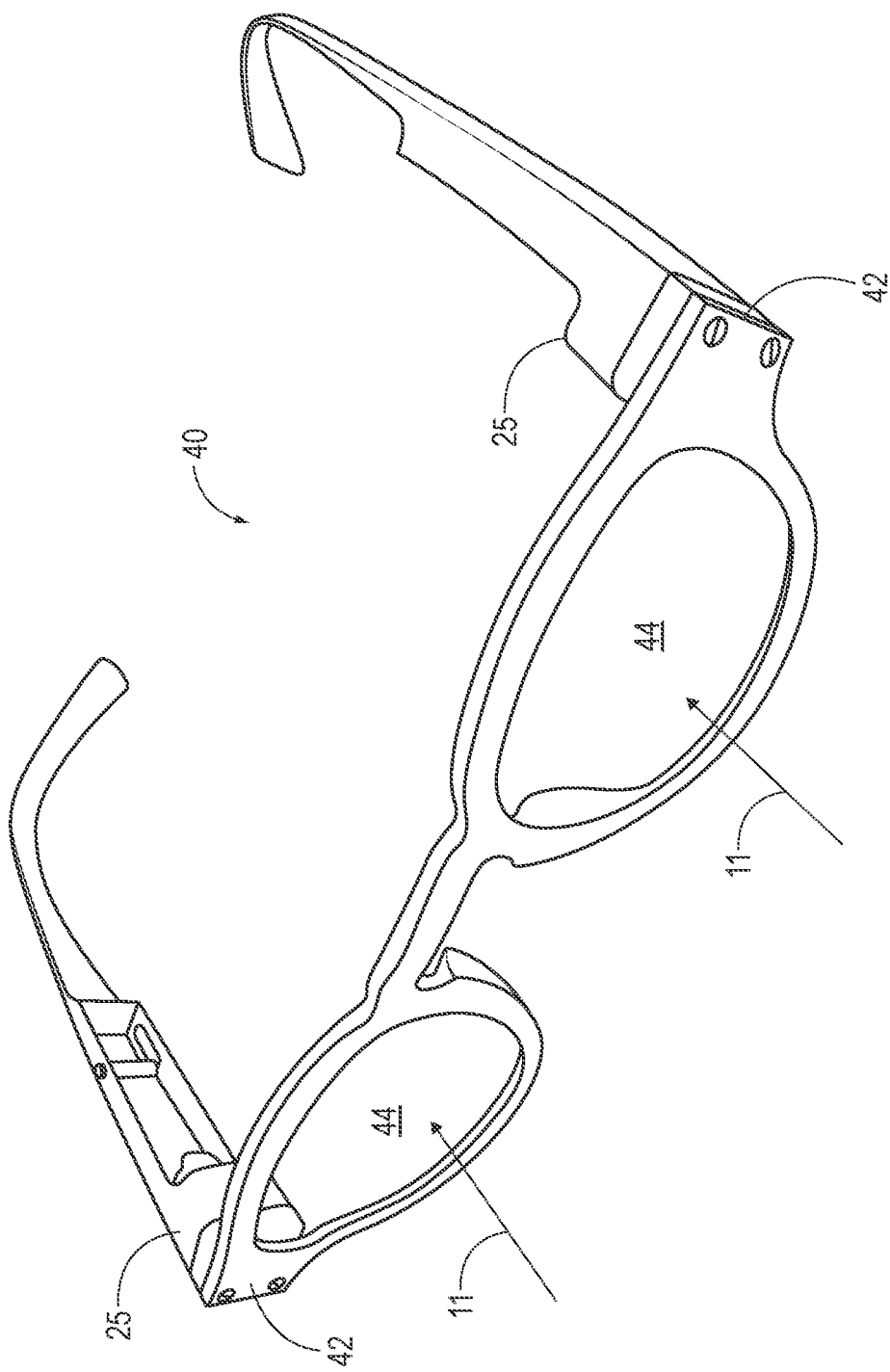
FIG. 6 illustrates a perspective view of a pair of eyeglasses including eyepieces according to some embodiments.

In some embodiments, an optical waveguide combiner 2 and camera(s) 6,7 of any embodiments disclosed herein forms an eyepiece for a pair of eyeglasses, for example, as shown in FIGS. 4 & 5. A projector 25 is arranged to inject image rays into input coupler 3. One non-limiting example of such a projector is shown in FIG. 6. In some embodiments, each camera 6,7 is a wafer level camera. By way of example, first camera 6 and second camera 7 are about 2.5 mm×4 mm in volume (assuming use of Omnivision Ov01A10 laptop webcam module for the cameras and sold under the registered trade mark OMNIVISION™ of OmniVision Technologies, Inc. These are just merely some examples of the ultra small camera sizes. Other sizes and types of known and/or future developed ultra small cameras are envisaged.

In FIG. 4, optical wave combiner 2 is orientated such that input coupler 3 is disposed within an end portion 42 of eyepiece 44. The area designed to be outside the field of view of eyebox 16 (in this case the pre-expansion region 22) is proximal to end portion 42 of the eyepiece. The output coupler area that is designed to be inside the usable field of view of eyebox 16 is spaced from end portion 42. The projector may either be disposed on the opposite side of the eyepiece facing away from the eye or it may be disposed on the same side of the eyepiece according to the mode of image introduction to input coupler 3. Typically, an image pupil is introduced to input coupler 3 in a direction orthogonal to the surface of waveguide combiner 2. The barrel of a projector may be oriented essentially orthogonal to input coupler 3, or essentially parallel to input coupler 3, in which case a turn prism is used to direct light from the projector into input coupler 3. Another optical waveguide combiner 2, arranged as shown in FIG. 4, can be provided as an eyepiece of the pair of eyeglasses to provide binocular vision.

In some aspects of the present technology, any one of the optical display systems comprising one or more optical waveguide combiners 2 and optionally one or more cameras 6,7 of the embodiments described herein may be implemented in a near-eye optical display system having an eyeglass form factor or head set form factor. In some embodiments, the near-eye optical display system additionally includes a light engine (projector or other light engine) and a battery. The near-eye optical display system may be an AR or MR optical display system.

By way of example, reference is made to FIGS. 4 & 5 taken in conjunction with FIG. 6, which is a perspective view of a pair of glasses 40 according to some embodiments. Glasses 40 include eyepieces 44 which include optical waveguide combiners 2 and cameras 6,7. Projectors 25 are arranged within the temples/arms of glasses 40, and input couplers 3 are oriented towards the outermost edges of the eyepieces 44 in end portions 42 to be orthogonal to respective projectors 25 located in the arms of glasses 40. Since the input couplers 3 are provided in end portions 42 of the eyeglasses, light can be projected into respective input couplers 3 from projectors 25 and can be directed towards output couplers 8 of eye pieces 44. Output couplers 8 of eyepieces 44 expand the light in two dimensions and can couple it out of the waveguide towards the user's eyes. In some other embodiments, projectors may be aligned along the top of the frame which supports eyepieces 44; in which case a turn prism is used to couple image light into input couplers 3 which may be oriented beneath the top section of the frame supporting eye pieces 44.

Projector 25 shown in any of the embodiments disclosed herein may include any type of suitable near eye image projector which may include optics configured to generate a display image and output the display image collimated at infinity into optical waveguide combiner 2. In some embodiments, projector 25 is a wafer level projector. By way of non-limiting examples, the projector may be a LED, LCD display, or laser based device or other light source device for generating the display image. Projector 25 may include a LCoS, DMD, OLED or any other display panel that uses an emissive, transmissive or reflective display technology. The projector includes any optics required to collimate the display image to infinity such as a collimating lens. In some embodiments, the projector does not include any optics (lenses, mirrors) such as for example in the case of phase only (holographic) displays. In some embodiments the projector includes a self emitting micro LED display.

Figure 7B:
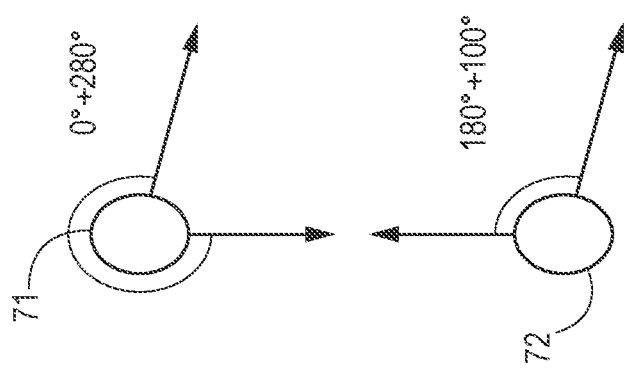
FIGS. 7A and 7B are schematics illustrating a theodolite calibration technique for the purpose of explaining camera self-calibration methods and systems of the embodiments.
Figure 7A:
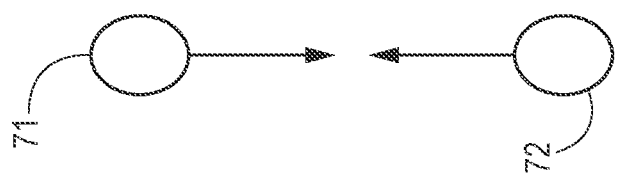

Reference will now be made to methods of camera self calibration in VR/AR/MR displays according to some aspects of the present technology. For the purpose of explaining such methods, reference is first made to FIGS. 7A, 7B, which are schematics illustrating existing theodolite calibration techniques. When calibrating physically dislocated systems for boresight, it is necessary to find a common reference. Often a pair of theodolites is used, first referencing to each other, then synchronously providing a reference to two other objects. By way of non-limiting example, Theodolite 71 picks up angular reference 0° and Theodolite 72 picks up angular reference 180° (see FIG. 7A). Theodolite 71 turns to angular reference 280° and Theodolite 72 turns to angular reference 280° (FIG. 7B).

Figure 8:
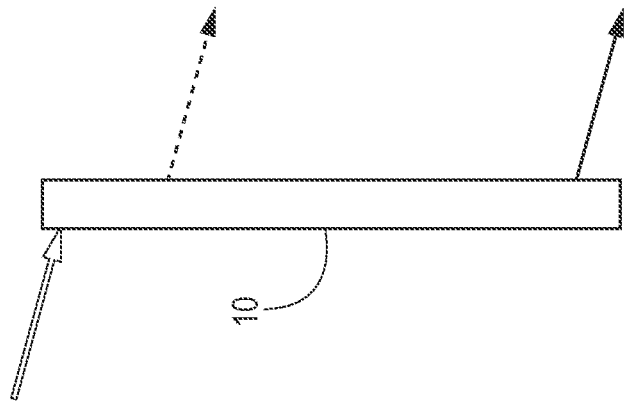
FIG. 8 is a schematic illustrating inherent references of a waveguide for the purpose of explaining methods and systems of camera self-calibration for AR/VR displays according to some embodiments.

As illustrated in FIG. 8, optical waveguide substrate 10 of optical waveguide combiner 2, inherently creates multiple references so that disposing the cameras on the waveguide substrate aligns the cameras without having to use calibration techniques, such as for example the aforementioned theodolite calibration techniques, to physically reference each other for boresight. Any misalignment of the fields of view 18,19 of first camera 6 and second camera 7 with the field of view of eyebox 16 at image plane 12 can be corrected electronically.

Figure 9:
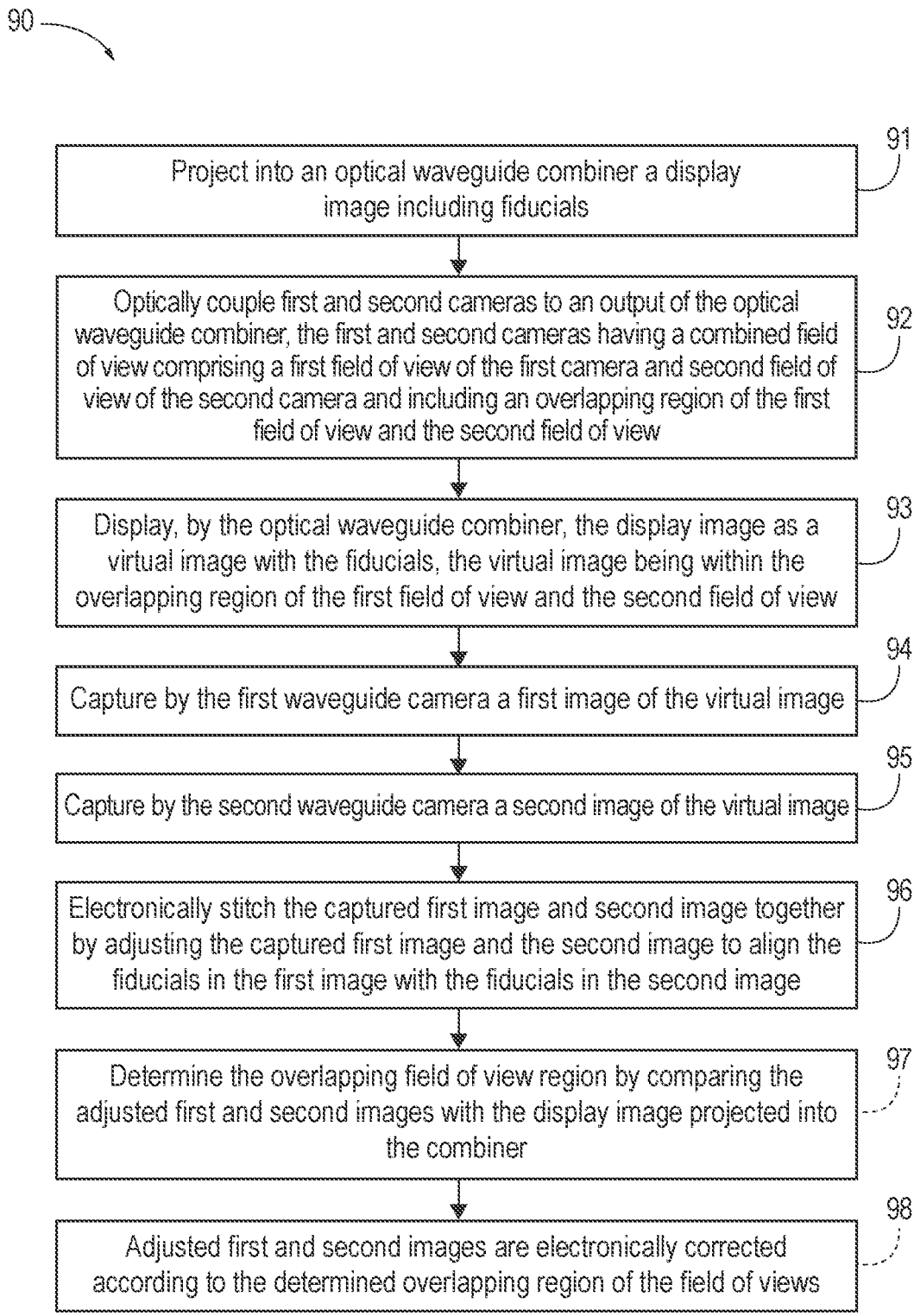
FIG. 9 is a flow chart illustrating a method according to some aspects of the present technology.

A method 90 of camera self-calibration of an VR/AR/MR display according to one aspect of the present technology will now be described with reference to FIG. 9. A display image including fiducials is projected into an optical waveguide combiner (step 91). First and second cameras are optically coupled to an output of the optical waveguide combiner, the first and second cameras having a combined field of view comprising a first field of view of the first camera and a second field of view of the second camera and including an overlapping region of the first field of view and the second field of view (step 92). The display image is displayed by the optical waveguide combiner at the image plane as a virtual image with the fiducials being in the overlapping region of the field of views of the first and second cameras (step 93). The first waveguide camera captures a first image of the virtual image (step 94). The second waveguide camera captures a second image of the virtual image (step 95). The captured first image and second image are electronically stitched together. In order to combine the first and second images to correspond to the displayed virtual image, the captured first image and captured second image are electronically adjusted by moving the captured first image and the captured second image to align the common fiducials (step 95). In some embodiments, further correction of the combined image is achieved by determining the overlapping region of the field of views by comparing the adjusted first and second images with the display image projected into the combiner (step 97). The adjusted first and second images are electronically corrected according to the determined overlapping region of the field of views (step 98). The corrected stitched first and second images substantially match the display image being projected into the optical combiner.

By method 90, a substantially full undistorted image of the virtual image at the image plane is derived from the first image captured by the first camera and second image captured by the second camera even when the first field of view of the first camera and the second field of view of the second camera are misaligned at the image plane. Consequently, calibration of the first and second cameras to allow for camera misalignment tolerances is achievable electronically without mechanical registration of the cameras or the use of additional sensors. The calibrated camera system can then be used for determining and correcting errors in registration of a displayed virtual object and a real object (so to correct virtual models of the real world). In some embodiments, method 90 is performed in real time during use of the optical display system by a user to account for any further misalignments caused during use of the display system.

Method 90 may be implemented in any one of the embodiments of the optical display systems disclosed herein or any other optical display system using an optical waveguide combiner in which a plurality of cameras are optically coupled to the output coupler of the optical waveguide combiner. In some embodiments of method 90, a plurality of cameras are optically coupled to a pre-exit pupil expansion output of the output coupler.

By way of example, some implementations of method 90 in optical display system 1 according to some embodiments will now be described with reference to FIGS. 10 to 15.

Figure 10:
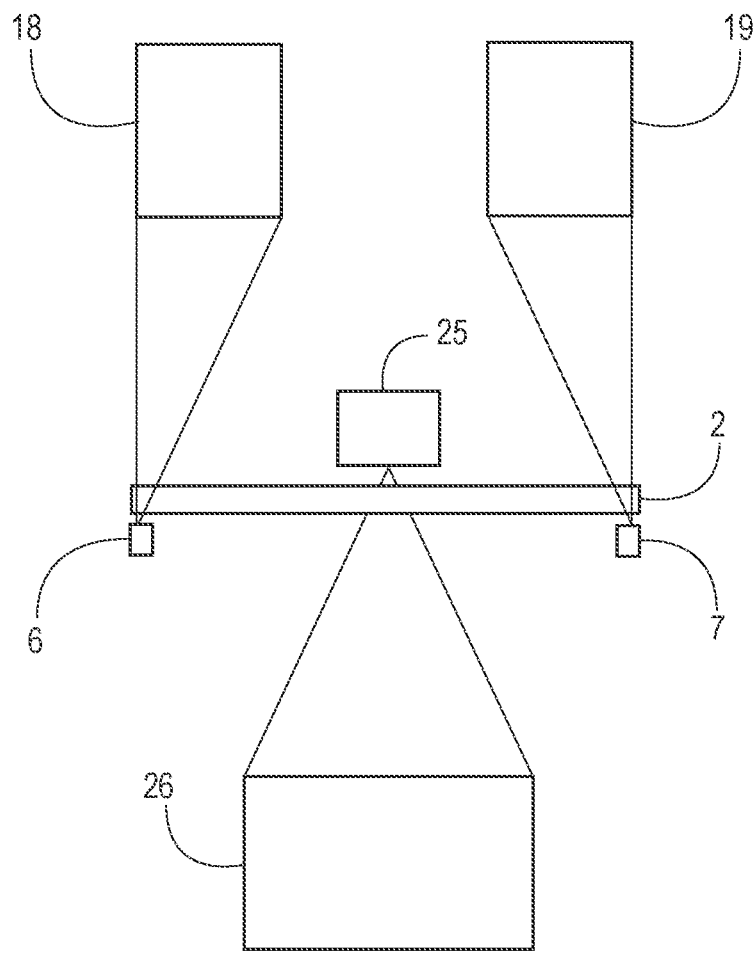
FIG. 10 is a schematic diagram illustrating fields of view of optical elements of the optical display system according to some embodiments.
Figure 11:
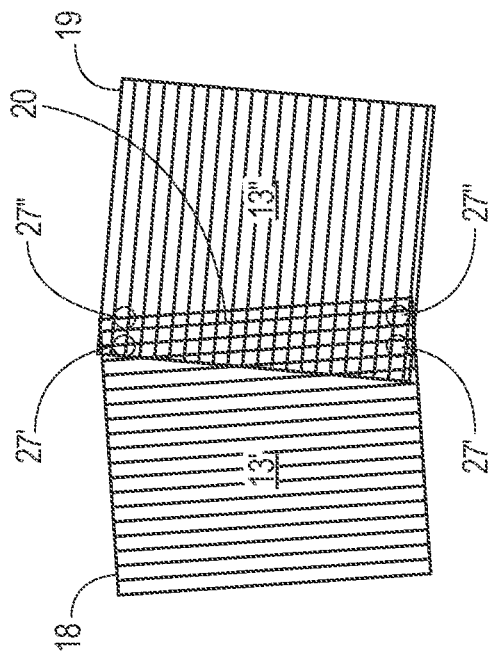
FIG. 11 is a plan view of the field of view of the projector including alignment fiducials according to some embodiments.

FIG. 10 is a schematic of the optical display system showing FOVs 18,19 of first and second waveguide cameras 6,7 of optical waveguide combiner 2 and field of view 25 of projector 25. A non-limiting example of a projector display image with fiducials or common features 27 is shown in FIG. 11. The alignment fiducials 27 are provided on a central vertical line through the image at upper and lower positions. FIG. 11 is just one non-limiting example of the size and position of alignment fiducials or common features 27. The position of the alignment fiducials or common features 27 are arranged for display by combiner 2 within the overlapping region 20 of first and second field of views of cameras 6,7 (see for example FIG. 1 or 2). Consequently, if the overlapping region 20 is in a different position rather than centrally located (due to the cameras having different sized FOV etc. or more than two cameras being used), the position of alignment fiducials or common features 27 will also be in a corresponding different location rather than centrally located.

The minimum size of alignment fiducials 27 is determined by the correction limit of cameras 6,7. In some embodiments, method 90 is performed using single pixel registration in which each fiducial 27 is the size of a single pixel. By way of example, the Camera FOV may be 25×30, 960×1080 and projector FOV may be 50×30 1920×1080). In some embodiments, wafer level cameras are used for first and second cameras 6,7 with correction limits of less than 2 pixels (see for example omnivision camera sensor 0V01A10, ¹⁄₁₁" 1.16 um 1280×800, 2.5×2 mm package size and sold under the registered trade mark OMNIVISION™ of OmniVision Technologies, Inc.) or less than 3 pixels (see for example ominvision camera sensor 0H0TA/31" 1.008 um 400×400 550×550 um package and sold under the registered trade mark OMNIVISION™ of OmniVision Technologies, Inc.).

Figure 12:
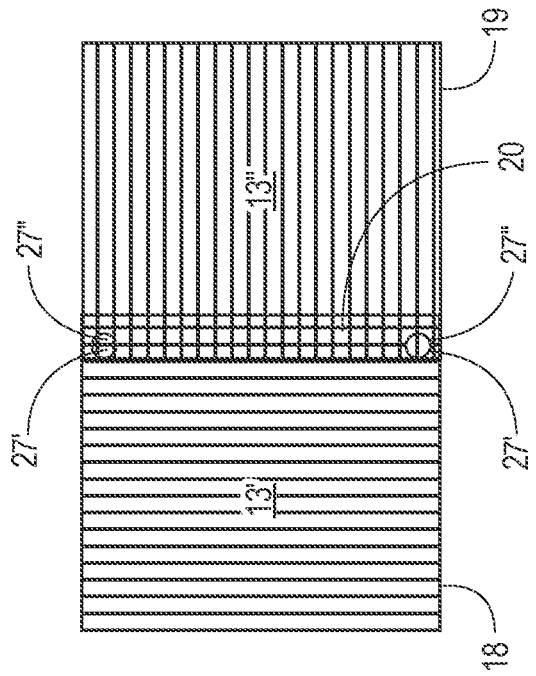
FIG. 12 is a plan view of virtual images captured by waveguide cameras with misaligned fields of views at the image plane of the optical display system.
Figure 13:
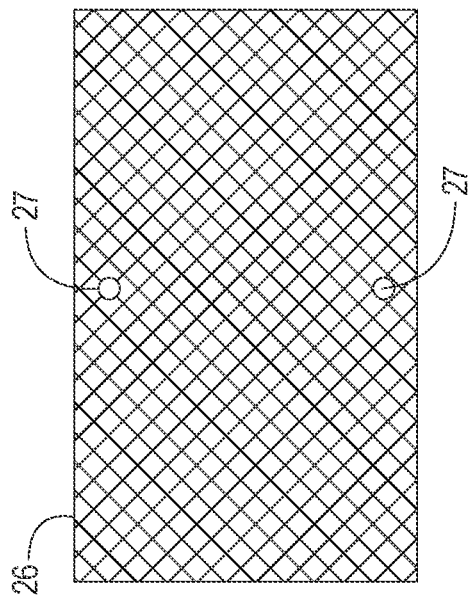
FIG. 13 is a plan view of the images of FIG. 12 electronically adjusted to align the alignment fiducials.
Figure 14:
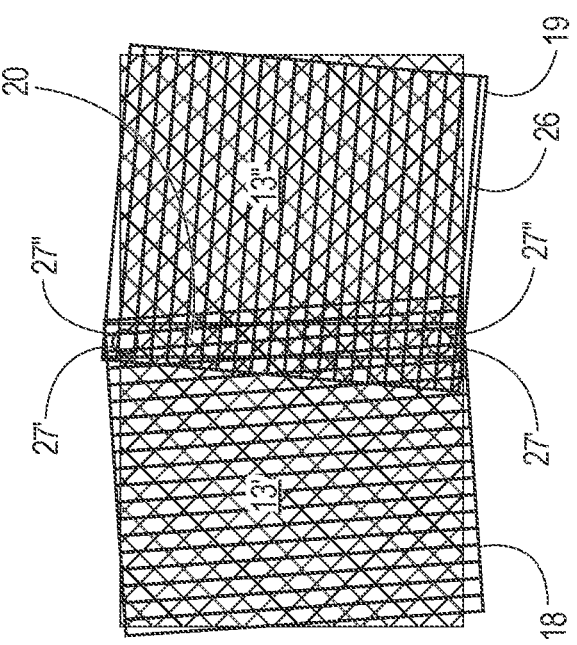
FIG. 14 is a plan view of the images of FIG. 13 electronically corrected to represent undistorted the virtual image displayed by the optical waveguide combiner system.

First image 13' captured by camera 6 with FOV 18 and second image 13" captured by camera 7 with FOV 19 are stitched together and include double imaged fiducials or common features as shown in FIG. 12. First and second images 13', 13" in the image of FIG. 12 are electronically moved to align the misaligned fiducials 27' and 27" and stitch the images together as shown in FIG. 13. In some embodiments, movement of first and second images 13',13" is achieved by rotational alignment, which manipulates each image to ensure the fiducials become superimposed. The projector field of view can be compared to the adjusted stitched image for determining the common area of first and second images 13', 13" which represents the overlapping region 20 of first field of view 18 and second field of view 19. FIG. 14 illustrates first image 13' and second image 13" of the stitched image in FIG. 13 corrected electronically according to the determined overlapping region 20. Once this correction of the camera views has been performed, a unified "virtual camera" image can be produced. The resulting corrected image corresponds substantially to an undistorted image that is viewable from eyebox 16. The misaligned first field of view 18 of first camera 6 and second field of view 19 of second camera 7 is effectively corrected without the cameras having to be physically moved. This corrected image can then be used as the computational feedback for determining and correcting errors in registration of a displayed virtual object and a real object (so to correct virtual models of the real world).

In some embodiments, first field of view 18 of first camera 6 and second field of view 19 of second camera 7 are sized such that the corrected stitched image is within a perimeter margin of the projector field of view to enable alignment correction of the first image and the second image within the alignment tolerances. By way of example, the area of the corrected image in FIG. 14 when compared to the projector field of view in FIG. 11 has an area that is within a perimeter margin of the projector field of view.

It will be understood that the FOVs 18 and 19 of respective cameras 6,7 are not limited to those shown in the figures. As previously mentioned, the FOV of camera 6 may be different from the field of view of camera 7. Furthermore, as previously indicated, the combined FOVs of camera 6,7 may be larger than the projector field of view. Yet furthermore, the projector field of view may be substantially within the combined field of view of first and second cameras 6,7. In some embodiments, only a portion of the projector field of view which includes a real object and a displayable virtual object for registration with the real object may be within the combined field of view of the cameras.

Figure 15:
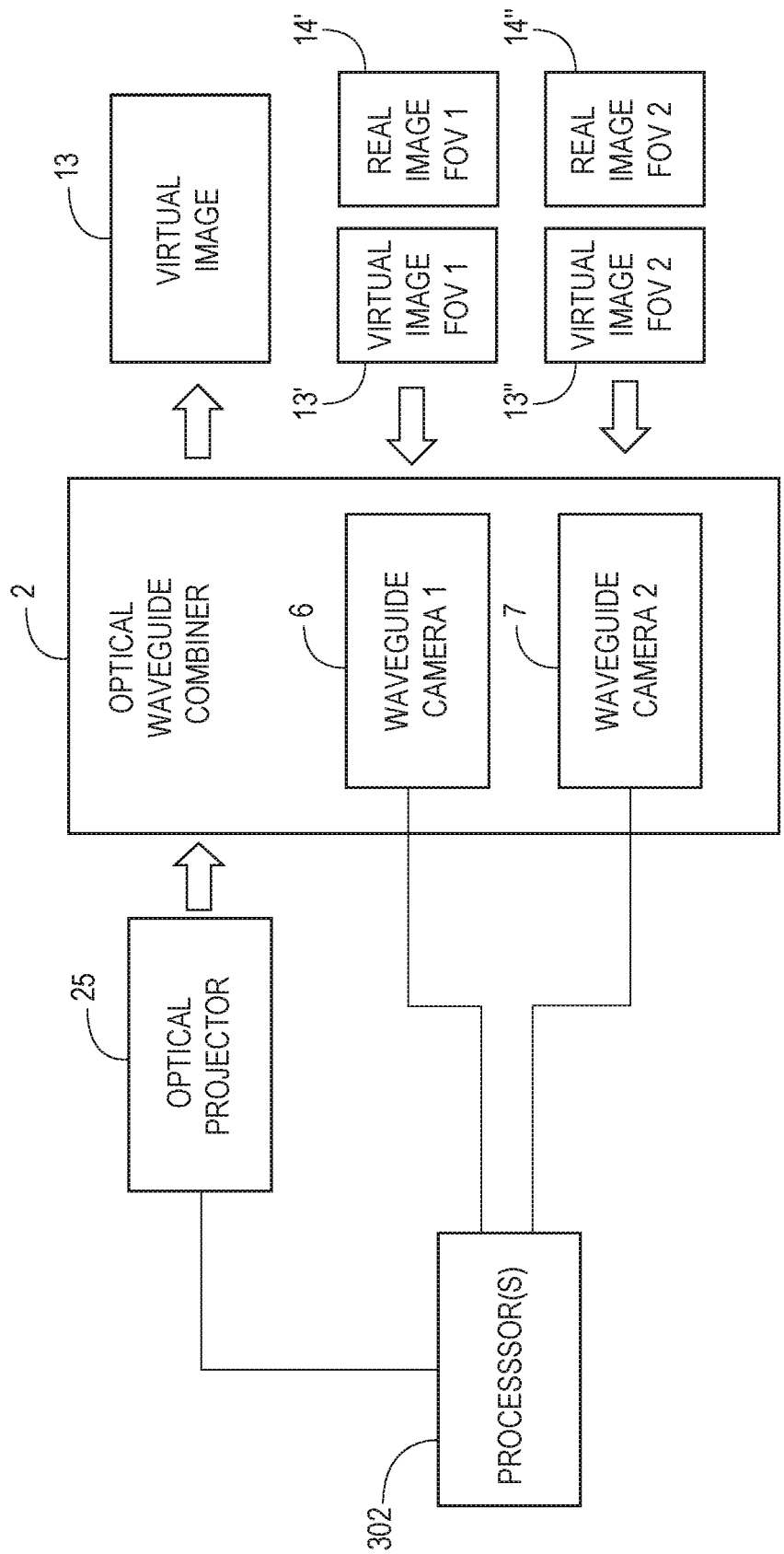
FIG. 15 illustrates a block diagram of an optical display system according to some embodiments.

FIG. 15 is a block diagram of the optical display system including the optical waveguide combiner system 1 and projector 25. Processor(s) 302 are operably connected to cameras 6,7 and projector 25. It will be appreciated that the processor(s) described herein and illustrated in the accompanying drawings may be located locally with the cameras/projector and/or located therefrom and operably connected to the cameras/projector via a suitable network which may be wireless and/or wired.

Processor(s) 302, when executed by computer program instructions, causes the optical display system to perform method 90 or other camera calibration methods disclosed herein to account for any misalignment of first and second cameras 6,7.

Reference will now be made to various methods and systems for VR/AR/MR display registration according to some aspects of the present technology.

Figure 16:
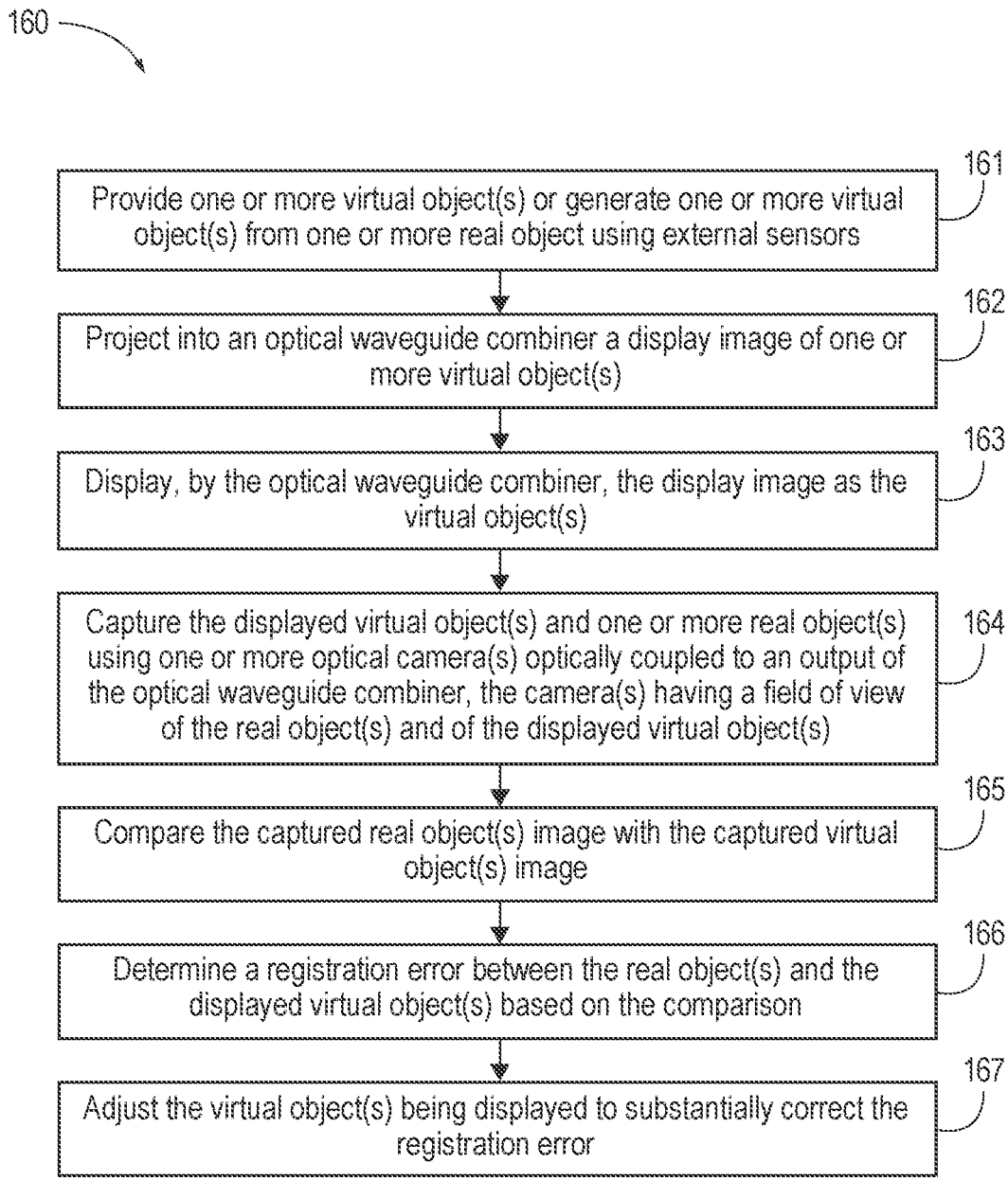
FIG. 16 illustrates a flow chart of a method according to some aspects of the present technology.

A method 160 of registering an AR/VR/MR display according to one aspect is illustrated in FIG. 16. One or more virtual object(s) is provided or generated from one or more real object(s) using external sensors (step 161). A display image of the virtual object(s) is projected into an optical waveguide combiner (step 162). The optical waveguide combiner displays the display image as the virtual object(s) (step 163). An image of the displayed virtual object(s) and real object(s) is captured using one or more optical camera(s) optically coupled to an output coupler of the optical waveguide combiner. The camera(s) has a field of view of the real object(s) and of the displayed virtual object(s) at the image plane of the combiner (step 164). The captured real object(s) image is compared with the captured virtual object(s) image. In some embodiments, a displayed virtual object in the captured image is individually compared with one or more real object(s) in the captured image. In some embodiments, at least some or all of the virtual objects in the captured image are grouped together and compared to a real object or a corresponding group of real objects. A registration error between the real object(s) and the displayed virtual object(s) is determined based on the comparison (step 165). The virtual image being displayed is adjusted to substantially correct the registration error (step 166).

Method 160 may be implemented in any one of the embodiments of the optical display systems disclosed herein or any other optical display system using an optical waveguide combiner in which one or more camera(s) is optically coupled to the output of the optical waveguide combiner. Furthermore, the or each camera may be arranged in the optical wave combiner according to any of the embodiments herein. In some embodiments of method 160, one or more of the camera(s) is optically coupled to a pre-exit pupil expansion output of the output coupler.

Figure 17:
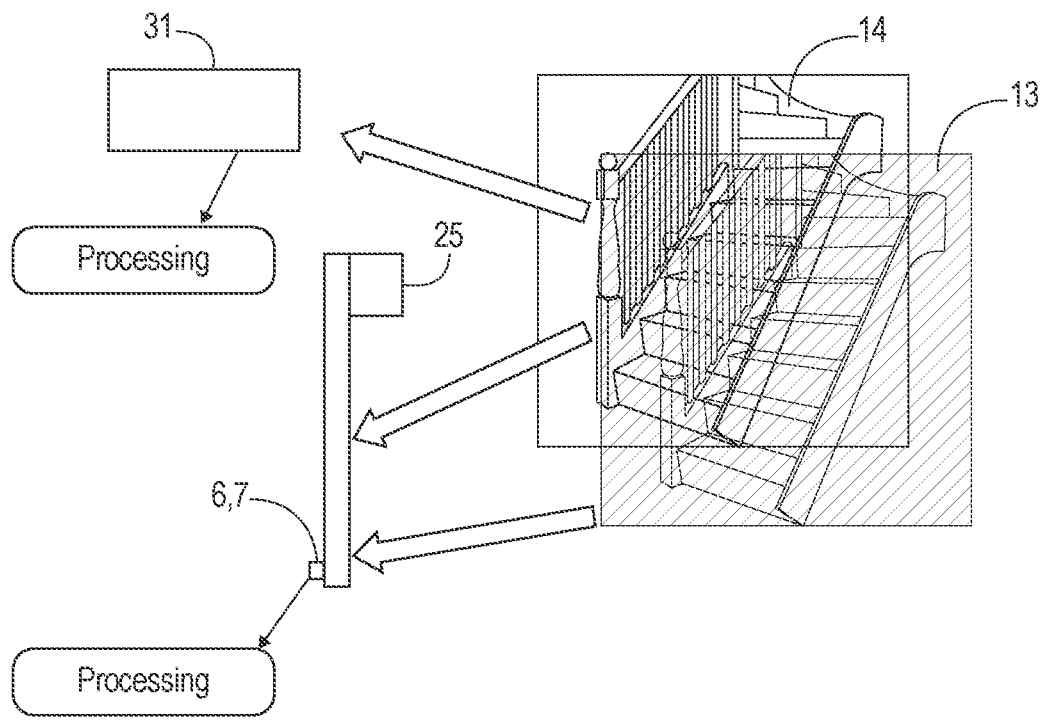
FIG. 17 illustrates a schematic of an optical display system according to some embodiments showing a displayed virtual object and real object misaligned.
Figure 18:
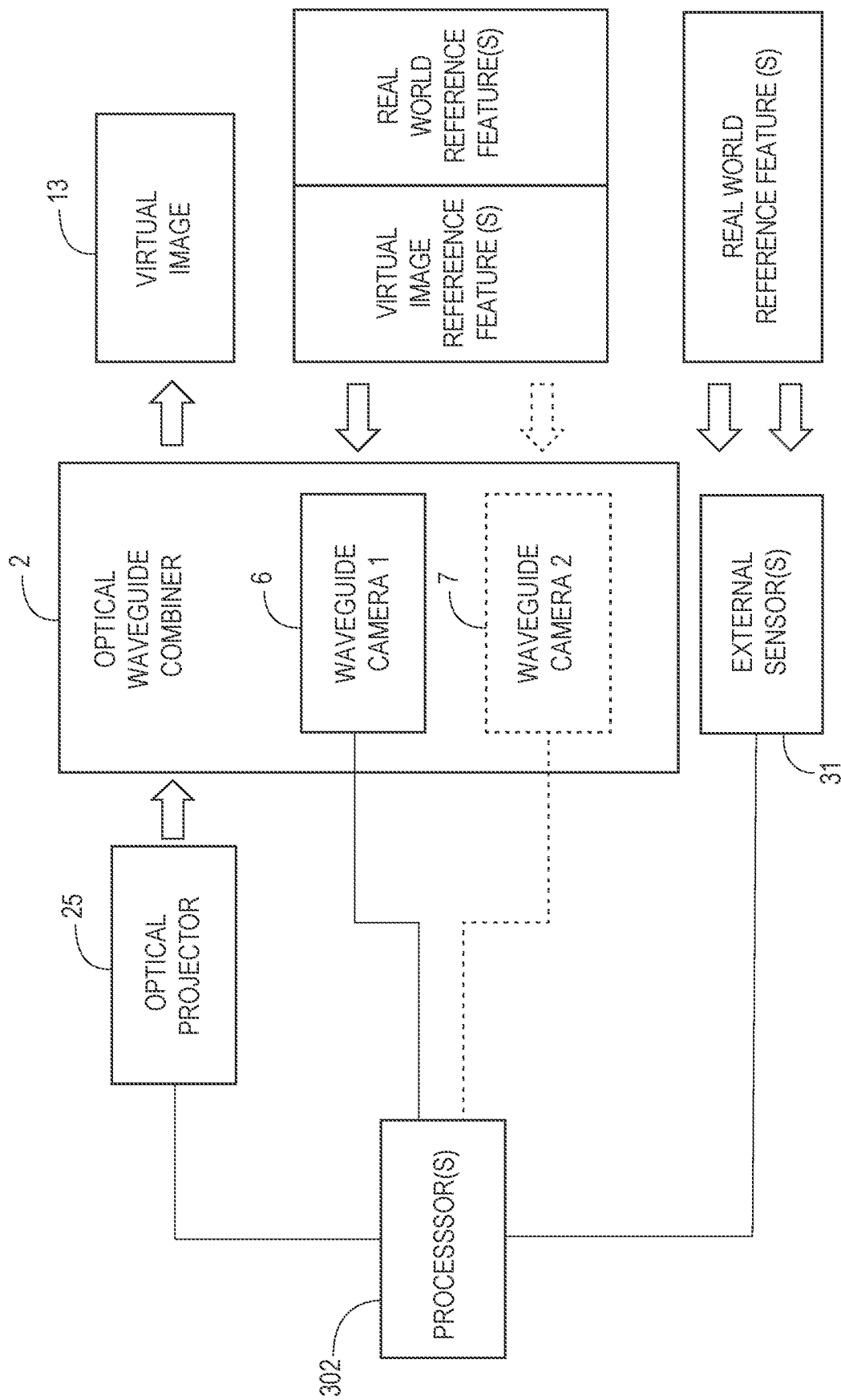
FIG. 18 illustrates a block diagram of an optical display system according to some embodiments.

By way of example, FIGS. 17 and 18 illustrate an optical display system according to some embodiments in which method 160 may be implemented. FIG. 17 is a schematic of optical waveguide combiner 2 displaying a virtual object at the image plane that is misaligned with the real object. FIG. 18 is a block diagram of the optical display system including the optical waveguide combiner 2, projector 25 and external sensor(s) 31. Processor(s) 302, when executed by computer program instructions, causes the optical display system to perform the method 160 to account for any misalignment or mis-registration of displayed virtual object 13 and real object 14

Determination of the registration error from the comparison of virtual object 13 and real object 14 can be performed in various ways. In some embodiments, initially, a common fiducial in the real world that external sensor(s) 31 and the waveguide camera 6 can identify is determined by the optical display system or a user of the system. By way of non-limiting example, a common feature identified to serve as the common fiducial can be a detected edge, projected point, perhaps a reference LED on glove or boot. Processor(s) 302, when executed by computer program instructions, uses the external sensor(s) sensing and/or imaging of its reference location, that is, the common fiducial, to generate the virtual object for display at an image plane of the optical combiner 2. The virtual object exists in a virtual model produced by processor 302. Waveguide camera system identifies the real world feature from the image(s) being captured by the waveguide camera(s) and compares the identified real world feature to the common fiducial of the virtual object being displayed to determine the error in registration between the real world object 13 and displayed virtual object 14. Processor(s) 302, when executed by computer program instructions, can then adjust any one or combination of the position, size, and shape of the virtual image being displayed to substantially correct the registration error. This can be achieved by processor(s) 302, when executed by computer program instructions, adjusting virtual object 13 for display by optical waveguide combiner 2 according to the determined registration error to display virtual object 13 with a position, size, and/or shape in which the common feature or fiducial identified in the real object and the common feature or fiducial identified in the virtual object substantially coincide as viewed from the eyebox/cameras.

Figure 19:
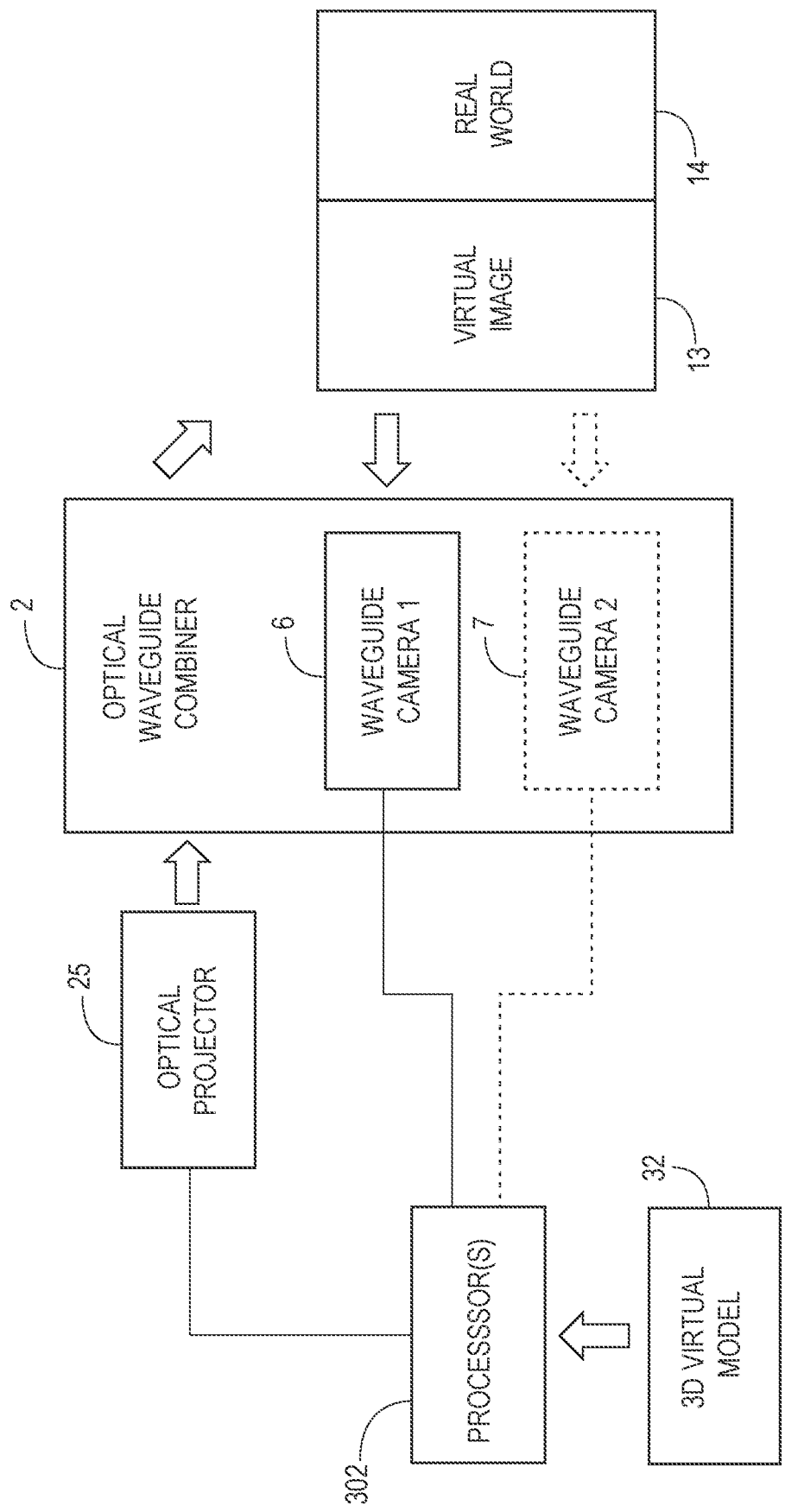
FIG. 19 illustrates a block diagram of an optical display system according to some embodiments.

In some embodiments of any one of the methods and/or systems for AR/VR registration disclosed herein, including method 160, generation of virtual object 13 for display can be performed by the optical display system without the use of external sensors/cameras of the AR display. In some embodiments, a predetermined virtual model of the real world is provided to the system. In some other embodiments, waveguide cameras 6,7 themselves are used to generate virtual object 13 for display by the system extracting virtual object 13 from the image of the real world being captured by the waveguide cameras. FIG. 19 illustrates a block diagram of an optical display system according to some embodiments in which method 160 is implemented with step 161 modified to provide the virtual object with known size using a predetermined virtual model 32 to generate virtual object 13 rather than generating virtual object 13 using external sensors of the AR display. Processor(s) 302, when executed by computer program instructions, causes the optical display system to perform method 160.

Figure 20:
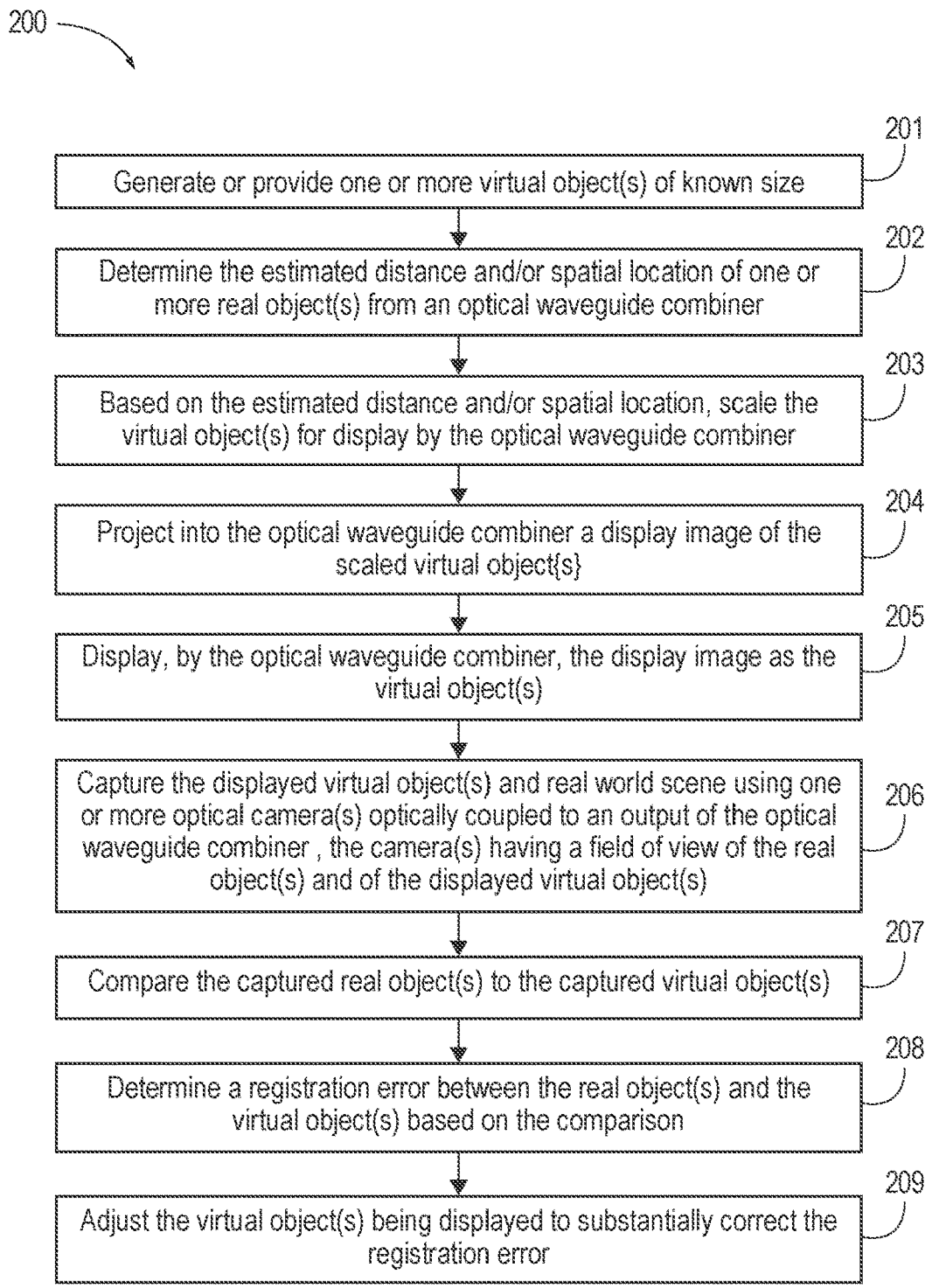
FIG. 20 illustrates a flow chart of a method according to some aspects of the present technology.

A method 200 of registering an AR/VR/MR display according to another aspect is illustrated in FIG. 20. One or more virtual object(s) of known size for display is provided generated (step 201). The estimated distance and/or estimated spatial location of real object(s) from an optical waveguide combiner is determined (step 202). Based on the estimated distance and/or estimated spatial location, the virtual object(s) is scaled for display by the optical waveguide combiner (step 203). A display image of the scaled virtual object(s) is projected into the optical waveguide combiner (step 204). The display image is displayed by the optical waveguide combiner as the scaled virtual object(s) (step 205). The image of the displayed virtual object(s) and real object(s) is captured using one or more optical camera(s) optically coupled to an output coupler of the optical combiner. The camera(s) have a field of view of the real object(s) and of the displayed virtual object(s) (step 206). The captured real object(s) is compared to the captured virtual object(s) (step 207). A registration error between the real object(s) and the displayed virtual object(s) is determined based on the comparison (step 208). The virtual object(s) being displayed is adjusted to substantially correct the registration error (step 209).

Method 200 may be implemented using any one of the embodiments of the optical display systems disclosed herein or any other optical display system using an optical waveguide combiner in which one or more camera(s) is optically coupled to an output coupler of the optical waveguide combiner. Furthermore, the or each camera may be arranged in the optical wave combiner according to any of the embodiments herein. In some embodiments of method 200, a plurality of cameras is optically coupled to a pre-exit pupil expansion output of the output coupler.

For example, method 200 may be implemented by the optical display system of FIG. 18 or FIG. 19 according to some embodiments in which processor(s) 302, when executed by computer program instructions, causes the optical display system to perform method 200.

Figure 21:
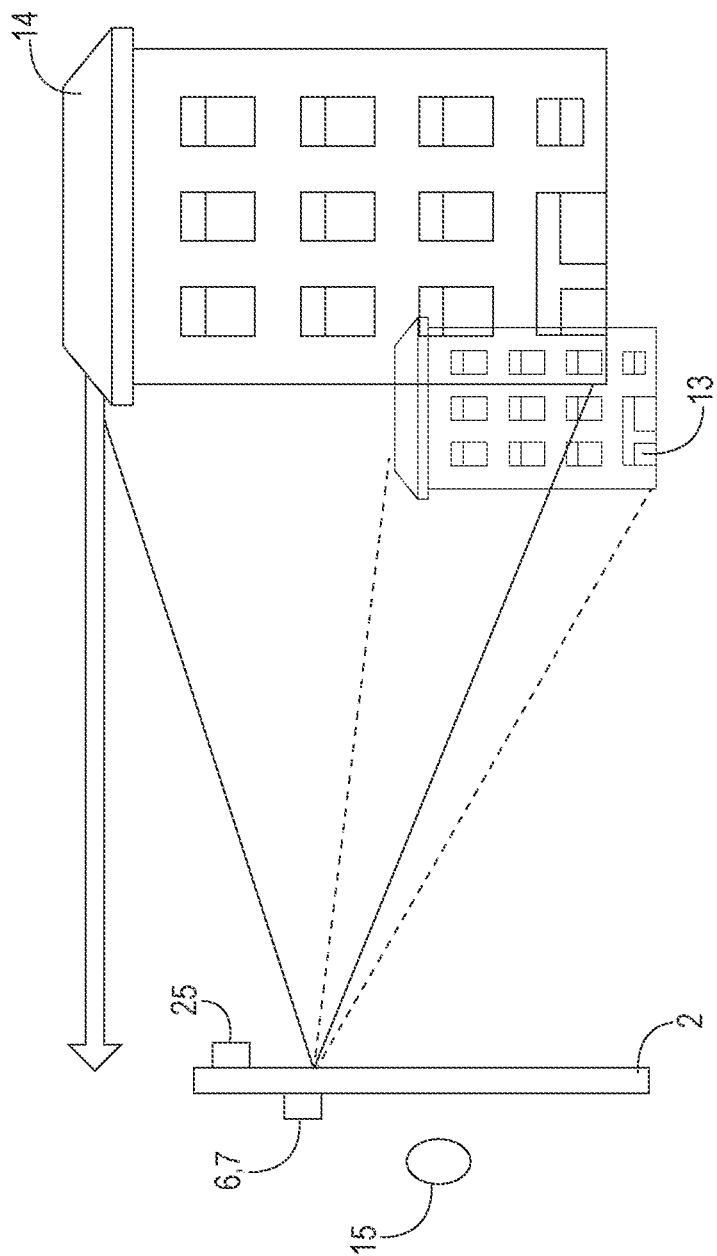
FIG. 21 illustrates a schematic of an optical display system according to some embodiments showing a displayed virtual object and real object misaligned.

By way of example, FIG. 21 illustrates an example implementation of method 200 using the optical display system FIG. 19 according to some embodiments. FIG. 21 is a schematic of optical waveguide combiner 2 of the optical display system displaying a virtual object 13 that is misaligned with real object 14. As illustrated, the system initially displays virtual object 13 according to the estimated distance and/or spatial location of real object 14 from optical waveguide combiner 2. This estimated distance and/or estimated spatial location of real object 14 from optical waveguide combiner 2 may be determined using a depth sensor. In some embodiments, the estimated distance and/or estimated spatial location may be determined using waveguide cameras themselves without any external sensors, as will be explained in more detail below with reference to some embodiments. Waveguide cameras 6,7 are used to compare the angular size, of real object 14 and displayed virtual object 13. The difference in angular size of displayed real object 14 and virtual object 13 reflects the registration error between virtual object 13 and real object 14. In this case, the estimate of distance to real world object is wrong. The correction in distance to real world object is calculated from the differential. Since the size of virtual object 13 is predetermined, virtual object 13 is scaled for the corrected distance of real object 14 and displayed by the optical combiner system based on the corrected distance. Processor(s) 302 determines and applies a calibration factor such that images projected into the waveguide are accurately scaled to match the real world. Following such calibration, virtual object 13 and real world object 14 are superimposed as viewed from eyebox/camera. The optical display system and/or method effectively achieves fitting of the real world to the virtual model 32 that has known dimensions.

In some aspects, methods and systems for AR/VR display registration according to any embodiments described herein with reference to a single optical combiner 2 can be implemented in binocular configurations comprising right and left optical combiners 2. The waveguide cameras capture a displayed stereo virtual image and a stereo real world image and compare the displayed stereo virtual image and a stereo real world image to determine the registration error. Such a registration error may for example be the result of misalignment of the optical wave combiners. The stereo virtual image being displayed can be corrected by adjusting the virtual images displayed by the optical combiners according to the registration error so that the stereo virtual image is displayed correctly.

Determining the actual location in space of the real object is necessary to perform accurate VR/AR/MR display. A computer can hold a 3-Dimensional model of the world, where all dimensions of the world are known to a good accuracy. This world can, by making a number of assumptions about a virtual position in space, be rendered in 2 dimensions and provided to the user by means of a display such as a computer monitor, virtual reality or augmented reality display. For the case of augmented reality, there often arises a problem in that the displayed 2D dimensional image of the world may not match the real world. This is because the assumptions made about the virtual position in space, do not match the actual location in space. Much effort is made with a number of sensors including GPS, LIDAR, RADAR, Time of flight and many other sensors to determine this position with accuracy.

Figure 22:
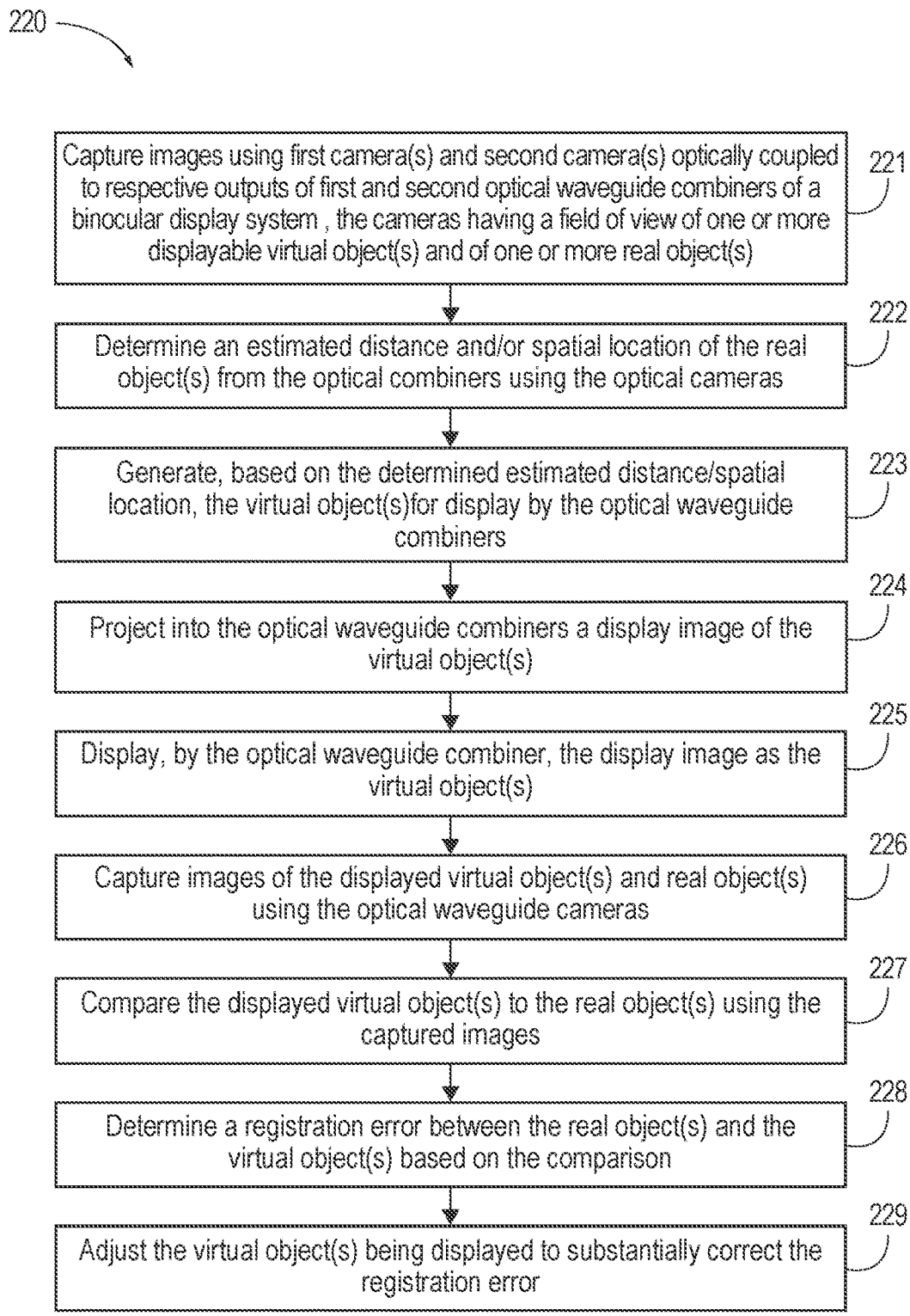
FIG. 22 illustrates a flow chart of a method according to some aspects of the present technology.

A method 220 of registering a VR/MR/AR display according to one aspect of the present technology is illustrated in FIG. 22. Images are captured using first camera(s) and second camera(s) optically coupled to respective outputs of first and second optical waveguide combiners of a binocular display system. Each camera has a field of view of one or more real object(s) and one or more displayable virtual object(s) (step 221). An estimated distance and/or estimated spatial location of the real object(s) from the optical waveguide combiners is determined using the optical cameras (step 222). The virtual object(s) for display by the optical waveguide combiner is generated based on the estimated distance and/or estimated spatial location (step 223). A display image of the virtual object(s) is projected into the optical waveguide combiners (step 224). The display image is displayed by the optical waveguide combiners as the virtual object(s) (step 225). An image of the displayed virtual object(s) and real object(s) is captured using the optical cameras (step 226). The displayed virtual object(s) is compared with the real object(s) using the captured image (step 227). A registration error between the real object(s) and the displayed virtual object(s) is determined based on the comparison (step 228). The virtual object(s) being displayed is adjusted to substantially correct the registration error (step 229).

Method 220 may be implemented in any one of the embodiments of the optical display systems disclosed herein arranged, in a binocular configuration or in any other optical display system using optical waveguide combiners in a binocular system. The first optical waveguide combiner and/or the second optical waveguide combiner may be any one of the optical waveguide combiners of the embodiments disclosed herein. Furthermore, the or each first camera may be optically coupled to the first optical waveguide combiner according to any of the embodiments herein. Yet furthermore, the or each second camera may be optically coupled to the second optical waveguide combiner according to any of the embodiments herein. In some embodiments of method 220, for each optical waveguide combiner, one or more of camera(s) is optically coupled to a pre-exit pupil expansion output of an output coupler of the optical waveguide combiner.

By way of example, an implementation of method 220 according to some embodiments will now be described with reference to FIG. 23 which illustrates a block diagram of a binocular optical display system. The binocular system comprises optical waveguide combiners 2L,2R, projectors 25 and processors 302. Processor(s) 302, when executed by computer program instructions, causes the binocular optical display system to perform method 220.

The process of determining the estimated distance and/or estimated spatial location of the real object (s) from the optical combiners using the optical cameras (step 222) can be performed in different ways according to different embodiments.

In some embodiments of the present technology, the estimated distance of the real object(s) from the optical waveguide combiners using the optical waveguide cameras (step 222) is determined based on a depth perception approach. In other embodiments, the estimated distance of the real object(s) from the optical waveguide combiners using the optical cameras (step 222) is determined based on stereopsis.

Furthermore, when the optical waveguide combiners are used in a binocular configuration (one for the right eye and one for the left eye), implementing methods and/or systems of registration and/or calibration of any of the embodiments disclosed herein for each optical waveguide combiner enables electronic correction of the images displayed by each waveguide to ensure correct alignment of the combined binocular image. As a consequence, a person looking through the pair of waveguides will perceive the augmented image correctly; if there were no self correction system present the person would not perceive an accurate binocular image and may in fact experience headaches due to the misalignment of the images projected by each waveguide.

Figure 24:
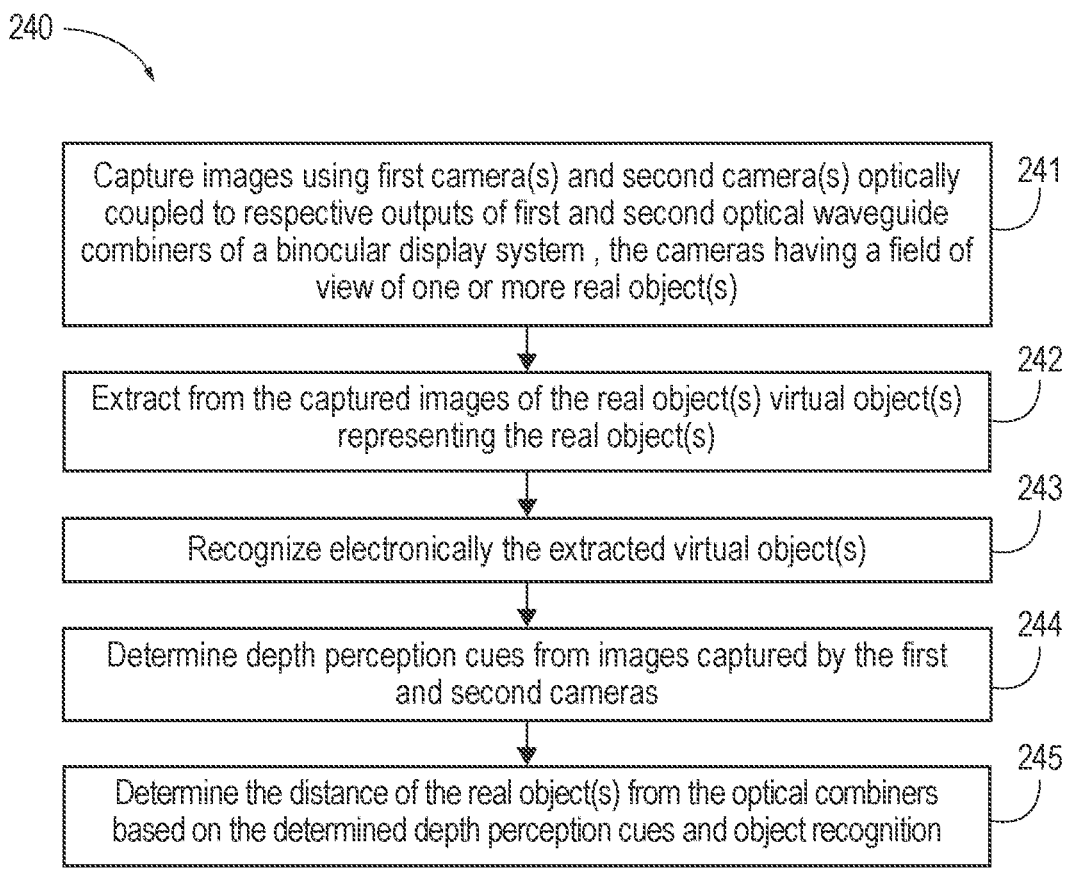
FIG. 24 illustrates a flow chart of a method according to some aspects of the present technology.

Method 240 of determining distance in an AR/MR/VR display according to one aspect of the present technology is illustrated in FIG. 24. Images are captured in stereo using first camera(s) and second camera(s) optically coupled to respective outputs of first and second optical waveguide combiners of a binocular display system.

The cameras having a field of view of one or more real object(s) (step 241). One or more virtual object(s) is extracted from the captured images of the real object(s). The extracted virtual object(s) is recognized electronically (step 242). Depth perception cues are determined from the images captured by the optical cameras (step 243). The distance of the real object(s) from the optical combiners is determined based on the determined depth perception cues and object recognition (step 244).

Method 240 may be implemented in any one of the embodiments of the optical display systems disclosed herein (or in any other optical display system using optical waveguide combiners in a binocular system in which one or more camera(s) is optically coupled to respective outputs of the optical waveguide combiners. The first optical waveguide combiner and/or the second optical waveguide combiner may be any one of the optical waveguide combiners of the embodiments disclosed herein. Furthermore, the or each camera may be arranged in the optical waveguide combiner according to any of the embodiments herein. Yet furthermore, in some embodiments, for each optical waveguide combiner, the one or more camera(s) is optically coupled to a pre-exit pupil expansion output of the output coupler of the optical waveguide combiner.

Figure 23:
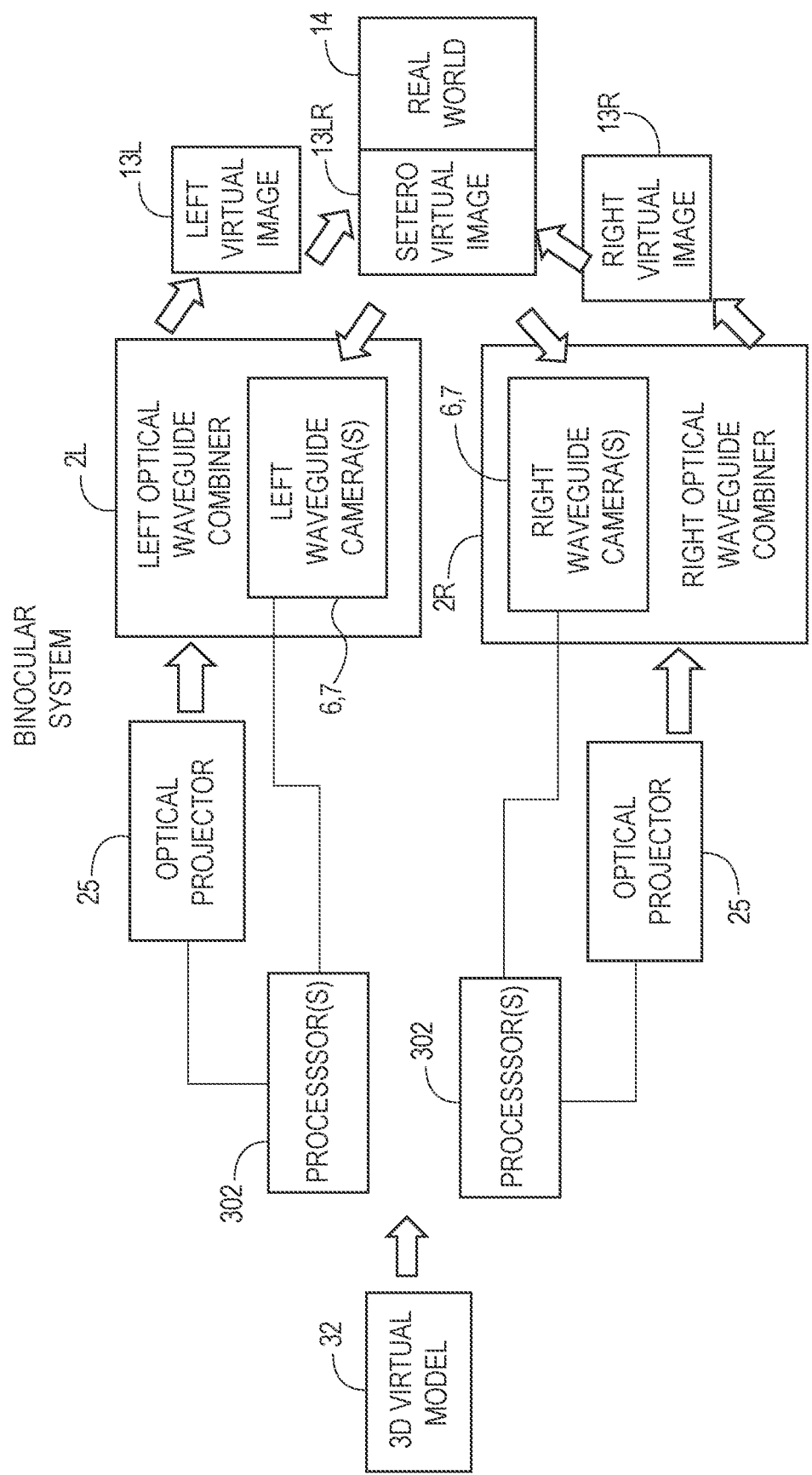
FIG. 23 illustrates a binocular optical display system according to some embodiments.

By way of example, according to some embodiments, method 240 may be implemented in the binocular optical display system of FIG. 23. Processor(s) 302, when executed by computer program instructions, causes the binocular optical display system to perform method 240.

Figure 25:
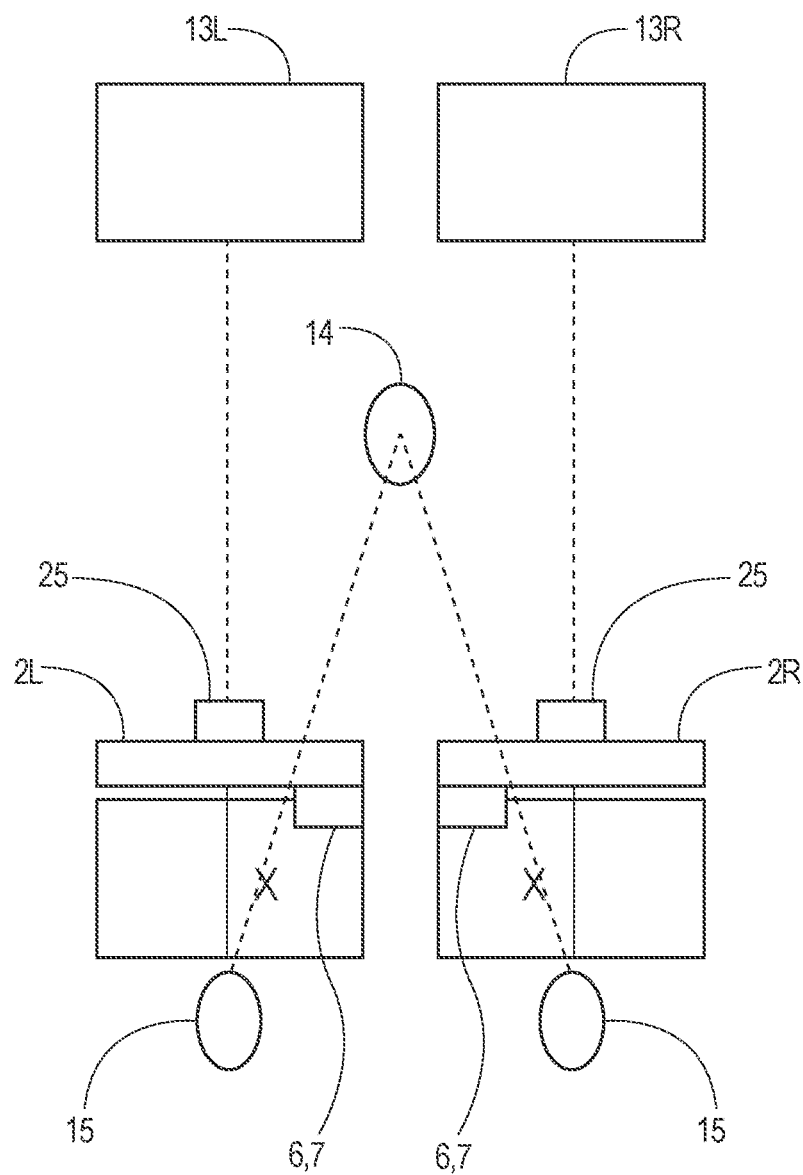
FIG. 25 illustrates schematic of a binocular optical display system according to some embodiments viewing a real object.

In step 244, depth perception cues can be determined from projection angles of the waveguide cameras. By way of example, FIG. 25 illustrates exemplary differences in projection angles of eyes/cameras incorporated in right and left optical waveguide substrates 2L and 2R of the optical display system of FIG. 23, viewing real object 14, for the purpose of object recognition and determining the depth perception cues according to some embodiments. Depth perception cues determined from the images captured by the optical waveguide cameras can comprise or include the following: $1^{st}$ Cue (Strongest) (Close to long distance), object size Vs expected object size (for example Big Cow=close, Small Cow=far); $2^{nd}$ Cue (close to moderate distance) object vergence, discrepancy in angle between the eyes/cameras. Always inward—convergence; $3^{rd}$ (weak) cue (close only) object accommodation the eye/camera has to focus.

In some aspects of the present technology, method 240 is employed in any one of the methods of registering AR/VR/MR displays of the embodiments disclosed herein to estimate or determine the distance or spatial position of the real object from the optical combiners. By way of example, process step 222 may comprise method 240.

Furthermore, object recognition techniques employed in method 240 may be adopted in any of the registration/calibration methods disclosed herein for generating a predetermined virtual object for display.

Figure 26:
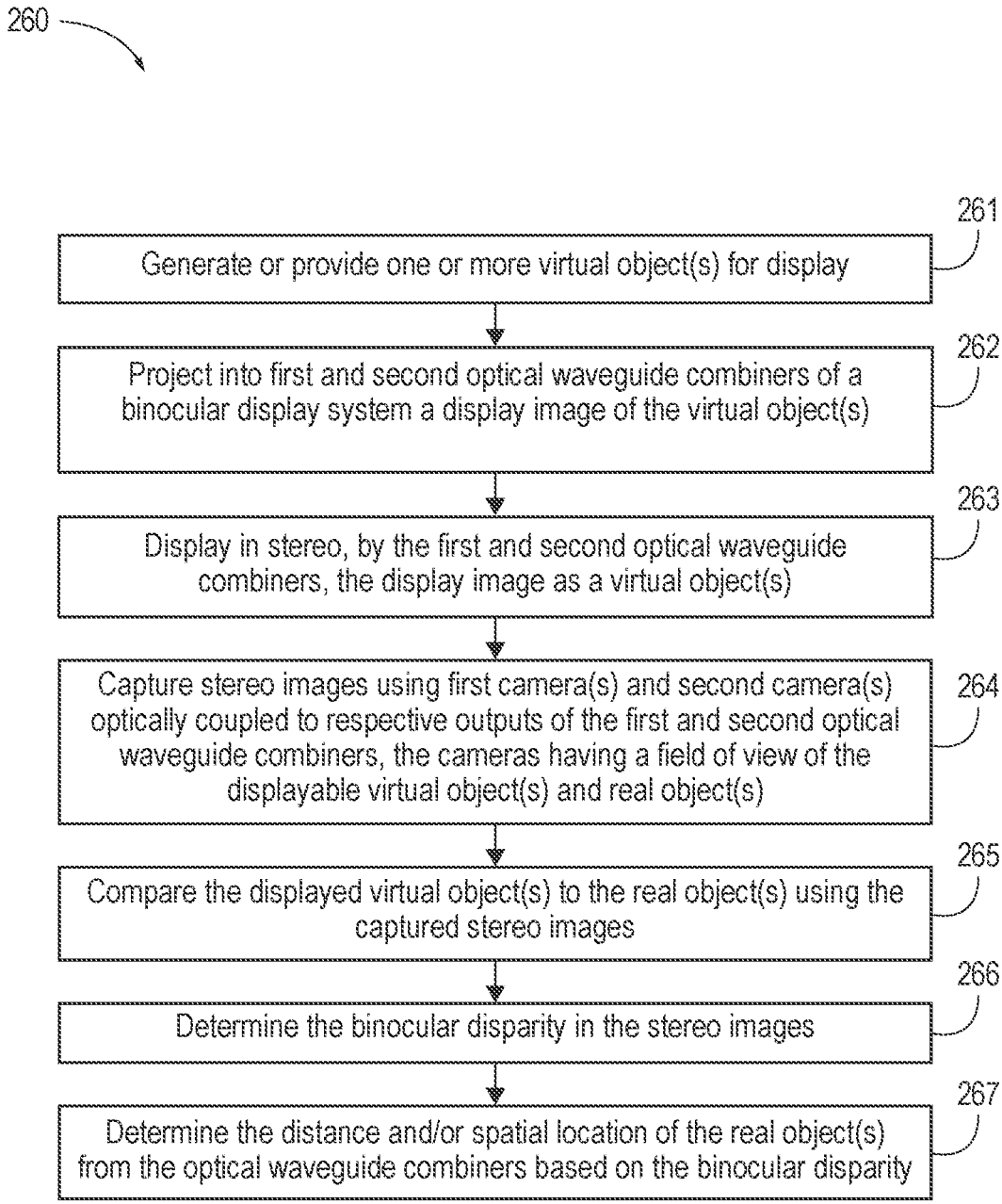
FIG. 26 illustrates a flow chart a method according to some aspects of the present technology.

Method 260 for AR/MR/VR display based on stereopsis according to another aspect of the present technology is illustrated in FIG. 26. One or more virtual object(s) for display is generated or provided (step 261). A display image of the virtual object(s) is projected into first and second optical waveguide combiners of a binocular optical combiner system (step 262). The display image is displayed in stereo, by the optical waveguide combiners, as a virtual object(s) (step 263). Stereo images are captured using first camera(s) and second camera(s) optically coupled to respective outputs of the first and second optical waveguide combiners. The cameras have a field of view of the displayable virtual object(s) and real object(s) (step 264). The displayed virtual object(s) is compared to the real object(s) using the captured stereo images (step 265). The distance and/or spatial location of the real object(s) from the optical waveguide combiners is determined based on the comparison of the displayed virtual object(s) compared to the real object(s) using the captured stereo images (step 266).

In some embodiments of step 265, a displayed virtual object in the captured image is individually compared with a real object or a group of real objects in the captured image. In some embodiments, at least some or all of the virtual objects in the captured image are grouped together and compared to a real object or a corresponding group of real objects.

In some embodiments, step 266 is performed by making a primary estimate of the distance (if object of known size) by determining from the stereo images the difference in angular extent from the cameras of the displayed virtual object relative to the real object. In some embodiments, a secondary estimate of distance can be calculated from the stereo images for close objects based on stereoscopic discrepancy (binocular disparity).

Using the determined distance and/or spatial location, the virtual object being displayed is adjusted by scaling to substantially correct the difference in spatial position between the displayed virtual object and the real object.

Method 260 may be implemented in any one of the embodiments of the optical display systems disclosed herein or in any other optical display system using optical waveguide combiners in a binocular system in which one or more camera(s) is optically coupled to an output coupler of the respective optical waveguide combiner. The first optical waveguide combiner and/or the second optical waveguide combiner may be any one of the optical waveguide combiners of the embodiments disclosed herein. Furthermore, the or each camera may be optically coupled to the optical waveguide combiner according to any of the embodiments herein. In some embodiments, for each optical waveguide combiner, one or more camera(s) is optically coupled to a pre-exit pupil expansion output of an output coupler of the optical waveguide combiner.

By way of example, method 260 according to some embodiments may be implemented by the optical display system of FIG. 23. Processor(s), when executed by computer program instructions, causes the binocular optical display system to perform method 260.

Figure 27:
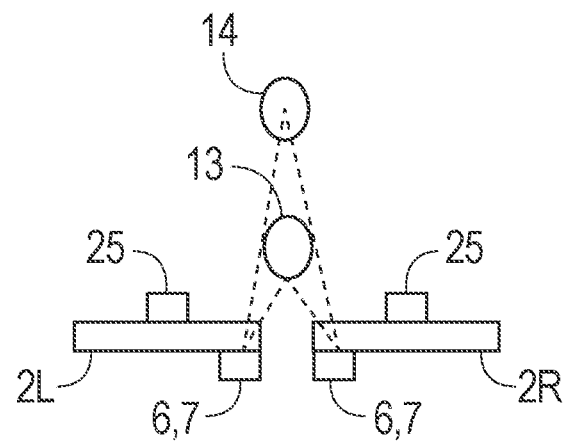
FIG. 27 illustrates Hyperstereopsis in the binocularly optical waveguide combiner system according to some embodiments as a result of the displayed virtual object and real object misalignment.
Figure 28:
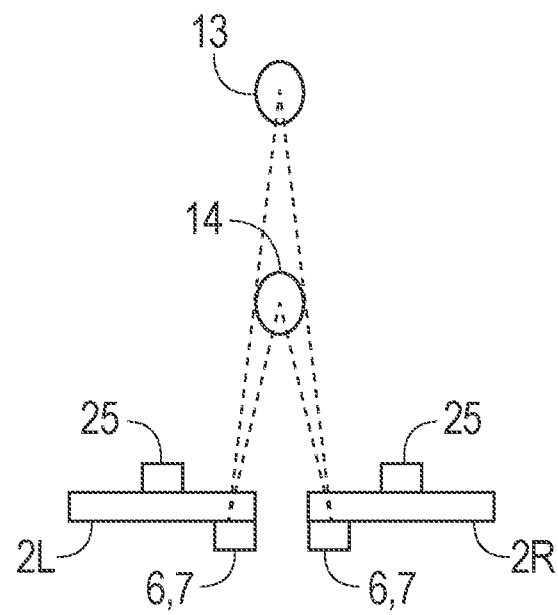
FIG. 28 illustrates Hypostereopsis in the binocularly optical waveguide combiner system according to some embodiments as a result of the displayed virtual object and real object misalignment.

In step 266, the binocular disparity in the stereo images is determined according to whether there is a Hyperstereopsis or Hypostereopsis viewing condition. By way of example, FIG. 27 illustrates example differences of projection lines of cameras incorporated in right and left optical waveguide combiners 2L, 2R of the optical display system of FIG. 23 stereo viewing real object 14 and virtual object 13 according to some embodiments. Cameras 6,7 see a larger angle discrepancy than expected when displayed virtual object 13 is too close to optical waveguide combiners 2L, 2R compared to real object 14 as shown in FIG. 27 (Hyperstereopsis). Cameras 6,7 see a smaller angle discrepancy than expected when displayed virtual object 13 is too far from optical waveguide combiners 2L, 2R compared to real object 14s shown in FIG. 28 (Hypostereopsis). The distance of real world object 14 from combiner 2 can be estimated from the virtual stereo error.

In some aspects of the present technology, method 260 is employed in any one of the methods of registering AR/VR/MR displays of the embodiments disclosed herein to estimate or determine the distance or spatial position of the real object from the optical combiners. By way of example, process step 222 may comprise method 260.

An exemplary use of the methods and optical display systems of some embodiments disclosed herein is a firefighter navigating through a poorly lit and smoke filled room. The firefighter may be equipped with a protective helmet that comprises an array of external sensors, including image depth sensor, thermal sensor, night vision camera, camera along with augmented reality waveguides comprising optical waveguide cameras on the inside of the helmet. Image data from the external sensors may be combined and presented on the waveguide display, enabling the firefighter to safely navigate through the environment, even in very low light, where the eyes may be unable to distinguish objects, in particular those that are low to the ground that might represent a trip hazard. Because the system constantly updates scaling parameters, the risk of an object appearing to be at a particular location based on the projected image from the waveguide, when in reality it is at a different location, or of an object appearing to have a certain size that is different to reality, is greatly reduced. In this instance the firefighter is less likely to have a collision with an object than might otherwise be the case. The systems and methods of the embodiments will ensure projected images are accurate both spatially and in size in conditions in which the cameras are more accurate than the human eye. Consequently, the present technology and the optical and computational feedback is able to function, and produce a corrected image of the world, even if the user (but not the cameras) is effectively blind to all but the virtual display.

When an object is close (arms length) the angles will be different to when the object is at a far distance; thus it is important to correct for scale and angular position. A further benefit is that the optical display systems and methods of some embodiments allow for compensation for differences in focal depth, permitting a user to view an object that may be at arm's length in addition to objects at a further distance.

Figure 29:
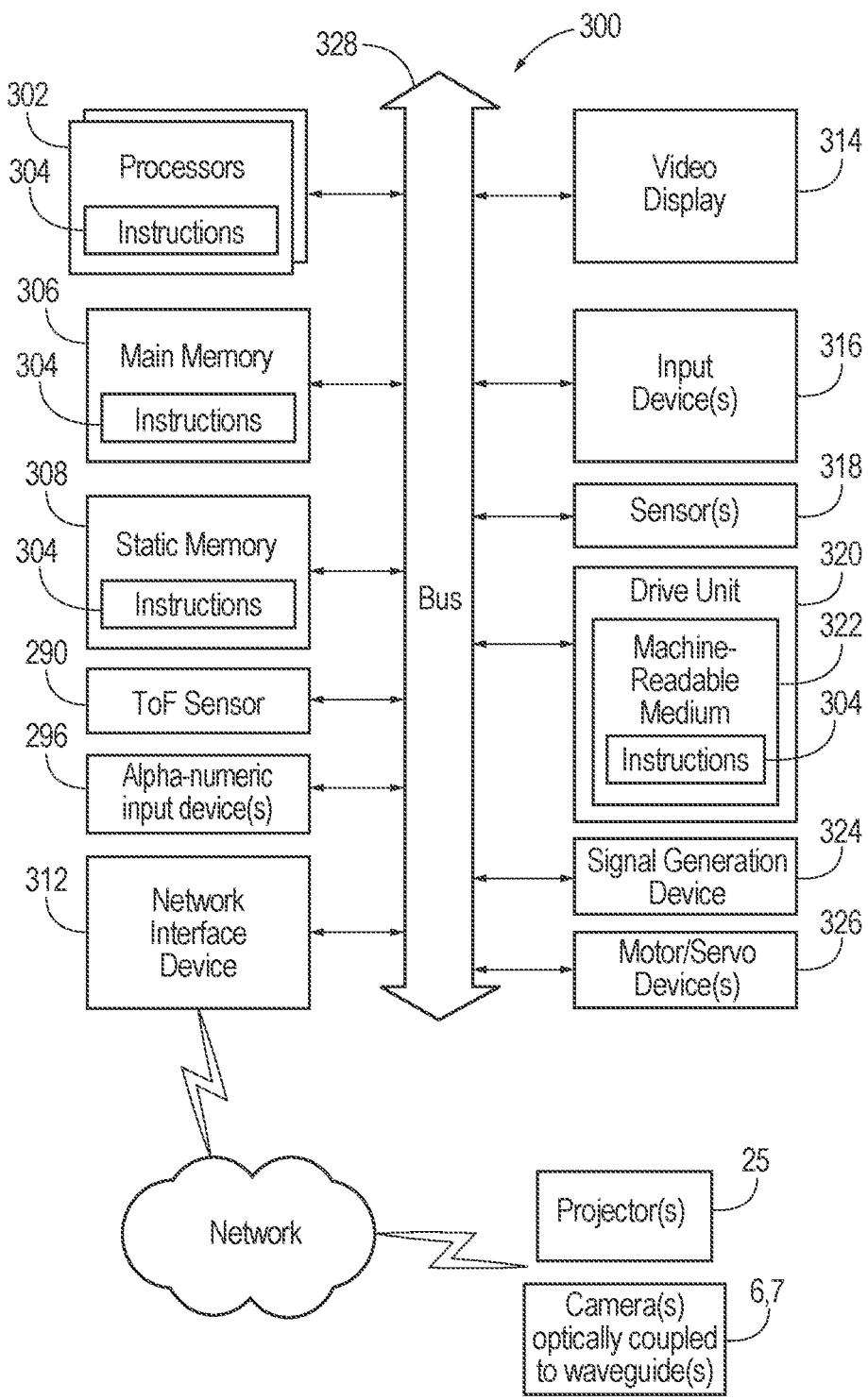
FIG. 29 illustrates an exemplary computing device that may be used to implement some embodiments of the present technology.

FIG. 29 is a diagrammatic representation of an example machine in the form of a computer system 300 which is an example of one or more of the computers or processors referred to herein and, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a module onboard an AR/VR/MR display or a remote computing device that interfaces with module interface electronics onboard the AR/VR/MR display. The remote computing devices may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 includes a processor or multiple processors 302 (e.g., a central processing unit (CPU), a graphics processing unit (GPU), or both), and a main memory 306 and optional static memory 308, which communicate with each other via a bus 328. The computer system 300 may further include a video display 314 (e.g., a liquid crystal display (LCD), touch sensitive display). The computer system 300 may also include an alpha-numeric input device(s) 296 (e.g., a keyboard, keypad, touchpad, touch display, buttons), a cursor control device (e.g., a mouse), a voice recognition or biometric verification unit (not shown), a drive unit 320 (also referred to as disk drive unit), a signal generation device 324 (e.g., a speaker), and a network interface device 312. The computer system 300 may further include a data encryption module (not shown) to encrypt data. The drive unit 320 includes a computer or machine-readable medium 322 on which is stored one or more sets of instructions and data structures (e.g., instructions 304) embodying or utilizing any one or more of the methodologies or functions described herein. The instructions 304 may also reside, completely or at least partially, within the main memory 306 and/or within the processors 302 during execution thereof by the computer system 300. The main memory 306 and the processors 302 may also constitute machine-readable media.

The instructions 304 may further be transmitted or received over a network via the network interface device 312 utilizing any one of a number of well-known transfer protocols (e.g., Hyper Text Transfer Protocol (HTTP)). While the machine-readable medium 322 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

For purposes of explanation, numerous specific details are set forth in order to provide a thorough understanding of the disclosure. It will be apparent, however, to one skilled in the art, that the disclosure may be practiced without these specific details. In other instances, structures and devices are shown at block diagram form only in order to avoid obscuring the disclosure.

Reference throughout this specification to "one embodiment" or "an embodiment" means that a particular feature, structure, or characteristic described in connection with the embodiment is included in at least one embodiment of the present technology. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the present technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analogue or digital) of those signals. It is further noted that various figures (including component diagrams) shown and discussed herein are for illustrative purpose only, and are not drawn to scale.

One skilled in the art will recognize that any one or more processors, cameras or other electronic devices disclosed herein may be configured to provide Internet access to one or more computing devices that are coupled to the Internet service or other network, and that the computing devices may include one or more processors, buses, memory devices, display devices, input/output devices, and the like. Furthermore, those skilled in the art may appreciate that the Internet service or other network may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated. Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks, and specified elsewhere in the description.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

In some embodiments, method steps. processes, functions/acts disclosed herein may be performed in a different order or combination. In some embodiments, one or more steps of methods processes, functions/acts disclosed herein may be omitted.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present technology. In this regard, each block in the flowchart or block diagrams or each method step or process summarized, described and/or claimed in this application may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the described embodiments of the present technology are illustrative only and that modifications thereof may occur to those skilled in the art. Accordingly, this present technology is not to be regarded as limited to the embodiments disclosed, but is to be limited only as defined by the appended claims herein. It will further be understood that any features described in relation to any particular embodiment may be featured in combinations with other embodiments, for avoidance of doubt.

While embodiments of optical displays and methods have been described in detail, it should be apparent that modifications and variations thereto are possible, all of which fall within the true spirit and scope of the present technology. With respect to the above description then, it is to be realized that the optimum dimensional relationships for the parts of the present technology, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present technology.

Therefore, the foregoing is considered as illustrative only of the principles of the present technology. Further, since numerous modifications and changes will readily occur to those skilled in the art, it is not desired to limit the present technology to the exact construction and operation shown and described, and accordingly, all suitable modifications and equivalents may be resorted to, falling within the scope of the present technology.

The invention claimed is:

1. An optical display system comprising:
 an optical waveguide combiner;
  wherein said optical waveguide combiner comprises:
   a waveguide optical substrate;
   an optical input coupler on, in or adjacent said waveguide optical substrate; and
   an optical output coupler on or in said a waveguide optical substrate, said optical input coupler being coupled via said waveguide optical substrate to said optical output coupler;
 and
 a plurality of cameras;
  wherein said plurality of cameras comprises a first camera and a second camera;
  wherein said first camera is optically coupled to the output coupler and has a first field of view of at least one virtual object displayable at an image plane by said optical waveguide combiner; the displayable virtual object(s) being in the field of view of an eyebox of the optical waveguide combiner;

wherein said second camera is optically coupled to the output coupler and has a second field of view of the virtual object(s) displayable by said optical waveguide combiner;

wherein, at the image plane, a combined field of view of the first camera and the second camera comprises the first field of view of the first camera and the second field of view of the second camera and includes an overlapping region of the first field of view and the second field of view; and wherein, at the image plane, the displayable at least one virtual object is within the combined field of view of the first camera and the second camera.

2. The optical combiner of claim 1, wherein said optical waveguide combiner is see through; and wherein at least one real object is viewable within the combined field of view of the first camera and the second camera.

3. The optical combiner of claim 1, wherein, at the image plane, the field of view of the eyebox and/or field of view of the projector is within the combined field of view of the first and second cameras.

4. The system of claim 2, wherein said plurality of cameras are located in a region outside the field of view of an eyebox of the optical waveguide combiner system.

5. The system of claim 4, wherein said output coupler comprises a pre-exit pupil expansion region and an exit pupil expansion region, and wherein said first camera and said second camera are optically coupled to the pre-exit pupil expansion region.

6. The system of claim 5, further comprising a projector configured to project a display image of the virtual object(s) into the input coupler.

7. The system of claim 6, further comprising at least one processor operably coupled to said projector and said first camera and said second camera, wherein said at least one processor is configured to cause the projector to project a display image of the virtual object(s) which includes fiducials, wherein the fiducials of the displayable virtual object(s) are within the overlapping region of the first field of view of the first camera and the second field of view of the second camera; and wherein said at least one processor is configured to electronically stitch together first and second images captured from the first and second cameras, respectively, by adjusting the first and second images to align the fiducials in the first image with the fiducials in the second image.

8. The system of claim 5, wherein said output coupler comprises any one or combination of prism arrays, cascaded mirrors, diffractive gratings and holograms.

9. The system of claim 5, wherein said output coupler comprises optical diffractive elements.

10. The system of claim 9, wherein said optical diffractive elements comprise two diffractive optical elements at least partially overlaid on one another in or on the waveguide substrate.

11. The system of claim 10, wherein said output coupler comprises a combined 2D expansion output diffractive grating.

12. The system of claim 5, wherein each camera of said plurality of cameras comprises a wafer level camera; and wherein said wafer level camera is incorporated in or on said optical waveguide combiner.

13. The system of claim 12, wherein said optical input coupler comprises an optical input diffractive grating, and wherein said optical input diffractive grating is in optical communication with said optical output grating without any intermediate optical diffractive grating therebetween.

14. The system of claim 1, wherein said optical waveguide combiner is incorporated in an eyepiece of a pair of eyeglasses.

15. A method of camera calibration for an AR/MR/VR display, the method comprising
projecting into an optical waveguide combiner a display image including fiducials, optically coupling first and second cameras to an output of the optical waveguide combiner, the first and second cameras having a combined field of view comprising a first field of view of the first camera and a second field of view of the second camera and including an overlapping region of the first field of view and the second field of view;
displaying, by the optical waveguide combiner, at an image plane, the display image as a virtual image with the fiducials, wherein the displayed virtual image is within the combined field of view of the first camera and the second camera, wherein the fiducials of the displayed virtual image at the image plane are within the overlapping region of the first field of view and the second field of view;
capturing by the first camera a first image of the virtual image;
capturing by the second camera a second image of the virtual image; and
electronically stitching the captured first image and second image together;
wherein electronically stitching the captured first image and second image together comprises electronically adjusting the captured first image and captured second image by moving the captured first image and the captured second image to align the fiducials of the first image with the fiducials of the second image.

16. The method of claim 15, wherein electronically stitching the captured first image and second image together further comprises determining the overlapping region of the first field of view and the second field of view by comparing the adjusted first and second images with the display image projected into the optical waveguide combiner; and
electronically correcting the adjusted first and second images according to the determined overlapping region.

17. The method of claim 16, wherein optically coupling the first camera and the second camera to the output of the optical waveguide combiner comprises optically coupling the first camera and the second camera to a pre-exit pupil expansion output of an output coupler of the optical waveguide combiner.

18. A method of registering a VR/AR/MR display, the method comprising providing at least one virtual object for display;
projecting into an optical waveguide combiner a display image of the virtual object(s);
displaying, by the optical waveguide combiner, the display image as the virtual object(s);
capturing an image of the displayed virtual object(s) and real world scene using one or more optical camera(s), the camera(s) being optically coupled to an output of the optical waveguide combiner and having a field of view of the real world scene and of the displayed virtual object(s);
comparing, using the captured image, the virtual object(s) to at least one real object of the real world scene;
determining a registration error between the virtual object(s) and the real object(s) based on the comparison;
adjusting the virtual object(s) being displayed to substantially correct the registration error.

19. The method of claim 18,
wherein comparing, using the captured image, the virtual object(s) with the real object(s) comprises
identifying a common feature or fiducial in the virtual object(s) and the real object(s); and
comparing said identified common feature or fiducial in the virtual object(s) with said identified common feature or fiducial in the real object(s);
wherein determining a registration error between the virtual object(s) and the real object(s) based on said comparison comprises
determining a difference in the position of said common feature or fiducial identified in the virtual object(s) and the position of said common feature or fiducial identified in the real object(s); and
wherein adjusting the position of the virtual object(s) being displayed to substantially correct the registration error comprises adjusting any one or combination of size, shape and position of the virtual object(s) whereby the common feature or fiducial identified in the virtual object(s) and the common feature or fiducial identified in the real object(s) substantially coincide.

20. The method of claim 19, wherein providing the virtual object(s) comprises generating a virtual object from a real object using external sensors.

21. A method of registering a VR/AR/MR display, the method comprising
generating or providing at least one virtual object of known size;
based on an estimated distance of at least one real object from an optical waveguide combiner, scaling the virtual object(s) for display by the optical waveguide combiner;
projecting into the optical waveguide combiner a display image of the scaled virtual object(s);
displaying, by the optical waveguide combiner, the display image as the virtual object(s);
capturing the displayed virtual object(s) and real object(s) using one or more optical camera(s), the or each camera having a field of view of the real object(s) and of the displayed virtual object(s);
comparing, using the captured image, the real object(s) to the virtual object (s);
determining a registration error between the virtual object(s) and the real object(s) based on the comparison; and
adjusting the virtual object(s) being displayed to substantially correct the registration error.

22. The method of claim 21, wherein
comparing the captured virtual object(s) to the real object(s) comprises
determining from the captured image an angular size and/or angle of the at least one real object from the point of view of the camera(s);
determining from the captured image an angular size and/or angle of the at least one virtual object from the point of view of the camera(s); and
wherein determining a registration error between the virtual object(s) and the real object(s) based on said comparison comprises determining the difference in angular size and/or angle of the at least one virtual object relative to the at least one real object; and
wherein adjusting the virtual object being displayed to substantially correct the registration error comprises adjusting any one or combination of the size, shape and spatial location of the at least one virtual object whereby the at least one virtual object appears substantially in the same spatial location as the real object when viewed from the eyebox.

23. A method of registration of a VR/MR/AR display system, the method comprising
capturing stereo images using first and second optical cameras of a binocular system, the first and second cameras being optically coupled to respective outputs of first and second optical waveguide combiners of the binocular system and having a field of view of at least one displayable virtual object and of at least one real object;
determining an estimated distance of the real object(s) from the optical waveguide combiners using the optical cameras and/or estimated spatial location of the real object(s) using the optical cameras;
generating the virtual object(s) for display by the optical waveguide combiners based on the estimated distance and/or estimated spatial location;
projecting into the optical waveguide combiners a display image of the virtual object(s);
displaying, by the optical waveguide combiners, the display image as the virtual object(s);
capturing an image of the displayed virtual object(s) and real object(s) using the optical cameras;
comparing the displayed virtual object(s) to the real object(s) using the captured image;
determining a registration error between the real object(s) and the virtual object(s) based on the comparison;
adjusting the virtual object(s) being displayed to substantially correct the registration error.

24. The method of claim 23, wherein determining an estimated distance of the real object(s) from the optical waveguide combiners using the optical cameras comprises:
extracting from the captured images of the real object(s) a virtual image representing the real object(s);
recognizing the extracted virtual object(s);
determining depth perception cues from the images captured by the optical cameras;
estimating the distance of the real object(s) from the optical waveguide combiners based on the determined depth perception cues and object recognition.

25. The method of claim 23, wherein determining a registration error between the real object(s) and the virtual object(s) based on the comparison comprises:
determining the difference in spatial location between the displayed virtual object(s) and the real object(s) from the binocular disparity in the stereo images.

26. A method of determining distance in an AR/MR/VR display, the method comprising;
capturing in stereo images using optical camera(s) for a binocular optical waveguide combiner system, the optical cameras having a field of view of at least one displayable virtual object and of at least one real object;
extracting from the captured images of the real object(s) at least one virtual object representing the real object(s);
recognizing the extracted virtual object(s);
determining depth perception cues from the images captured by the optical cameras;
determining the distance of the real object(s) from the optical waveguide combiners based on the determined depth perception cues and object recognition.

27. A method of determining distance in an AR/MR/VR display, the method comprising;
generating or providing at least one virtual object for display;

projecting into the optical waveguide combiners of a binocular optical combiner system a display image of the virtual object(s);
displaying in stereo, by the optical waveguide combiners, the display image as the virtual object(s);
capturing stereo images of the displayed virtual object(s) and at least one real object(s) using one or more optical camera(s) incorporated into each optical waveguide combiner of the binocular system, the one or more camera(s) having a field of view of the real object(s) and of displayed virtual object(s);
comparing the displayed virtual object(s) to the real object(s) using the captured stereo images
determining the binocular disparity in the stereo images;
determining the distance of the real object(s) from virtual object(s) according to the binocular disparity.

* * * * *